(12) United States Patent
Nozoe et al.

(10) Patent No.: US 8,974,875 B2
(45) Date of Patent: Mar. 10, 2015

(54) CELLULOSE ACYLATE FILM, POLARIZING PLATE USING THE SAME AND LIQUID CRYSTAL DISPLAY DEVICE

(71) Applicant: FUJIFILM Corporation, Tokyo (JP)

(72) Inventors: Yutaka Nozoe, Kanagawa (JP); Akio Tamura, Kanagawa (JP); Yu Naito, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/134,669

(22) Filed: Dec. 19, 2013

(65) Prior Publication Data

US 2014/0104546 A1   Apr. 17, 2014

Related U.S. Application Data

(63) Continuation of application No. PCT/JP2012/064227, filed on May 31, 2012.

(30) Foreign Application Priority Data

Jun. 24, 2011 (JP) ................. 2011-141240
Jan. 24, 2012 (JP) ................. 2012-012483

(51) Int. Cl.
| C09K 19/00 | (2006.01) |
| G02F 1/1335 | (2006.01) |
| C08J 5/18 | (2006.01) |
| C08L 1/12 | (2006.01) |
| G02B 1/10 | (2006.01) |
| C08L 1/10 | (2006.01) |
| C08L 45/02 | (2006.01) |

(52) U.S. Cl.
CPC ............. *G02F 1/133528* (2013.01); *C08J 5/18* (2013.01); *C08J 2301/10* (2013.01); *C08L 1/12* (2013.01); *G02B 1/105* (2013.01); *C08L 1/10* (2013.01); *C08L 45/02* (2013.01); *C08J 2301/12* (2013.01)
USPC ........... 428/1.3; 428/1.1; 428/1.31; 428/1.33; 349/96; 349/117; 349/118; 524/31; 524/37

(58) Field of Classification Search
CPC .................... G02F 1/133528; G02F 1/133533; C08L 1/08; C08L 1/10; C08L 1/12; C08L 1/14; C08L 45/02; C08J 2301/08; C08J 2301/10; C08J 2301/12; C08J 2301/14
USPC ............. 428/1.1, 1.3, 1.31; 349/96, 117, 118, 349/120; 524/31, 37
See application file for complete search history.

(56) References Cited

U.S. PATENT DOCUMENTS

2010/0291376 A1* 11/2010 Takebe et al. ................. 428/333
2010/0308264 A1* 12/2010 Furukawa et al. ....... 252/299.01

FOREIGN PATENT DOCUMENTS

| JP | 49-107322 A | 10/1974 |
| JP | 2003-12859 A | 1/2003 |
| JP | 2006-39024 A | 2/2006 |
| JP | 2009-234059 A | 10/2009 |
| JP | 2009-241256 A | 10/2009 |
| WO | 2007/125764 A1 | 11/2007 |
| WO | 2009/096071 A1 | 8/2009 |
| WO | 2009/130969 A1 | 10/2009 |
| WO | 2009/133815 A1 | 11/2009 |

OTHER PUBLICATIONS

Semerak et al., Effect of Molecular Weight on Blend Miscibility, ACS, May 1, 1984.*
International Search Report (ISA-210) for PCT/JP2012/064227 dated Jul. 10, 2012.

* cited by examiner

*Primary Examiner* — Gwendolyn Blackwell
*Assistant Examiner* — Ruiyun Zhang
(74) *Attorney, Agent, or Firm* — Jean C. Edwards, Esq.; Edwards Neils PLLC

(57) ABSTRACT

A cellulose acylate film containing a cellulose acylate and a specific polymer, the specific polymer containing a repeating unit derived from a monomer represented by formula (1):

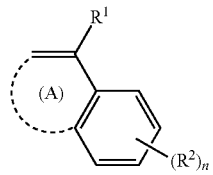

(1)

wherein $R^1$ represents a hydrogen atom or an aliphatic group having 1 to 4 carbon atoms; $R^2$ represents a substituent; (A) represents an atomic group necessary to form a 5- or 6-membered ring; and n represents an integer of 0 to 4.

16 Claims, 2 Drawing Sheets

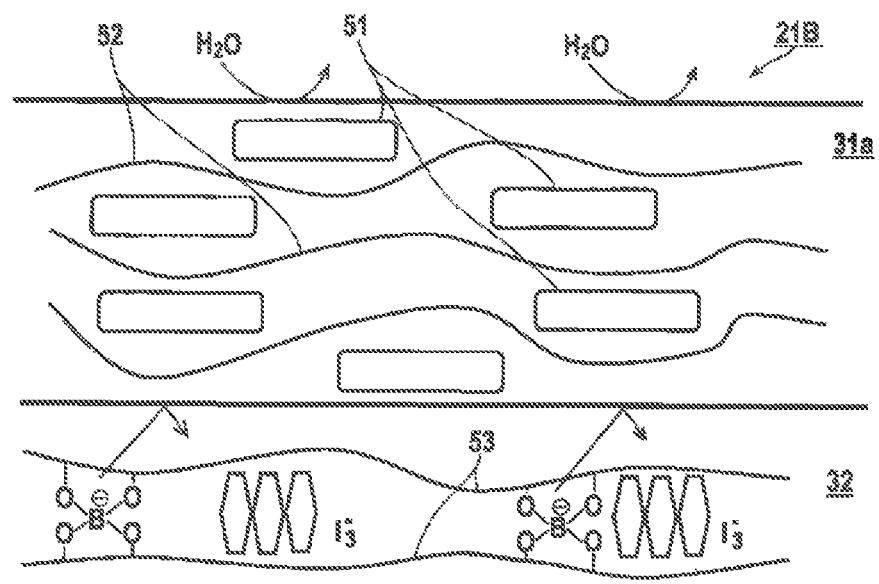

CELLULOSE ACYLATE FILM, POLARIZING PLATE USING THE SAME AND LIQUID CRYSTAL DISPLAY DEVICE

CROSS-REFERENCE TO RELATED APPLICATIONS

This application is a continuation of International Application No. PCT/JP2012/064227 filed on May 31, 2012, which was published under PCT Article 21(2) in Japanese, and claims priority claims priority from Japanese Patent Application Nos. 2011-141240, filed Jun. 24, 2011, and 2012-012483, filed Jan. 24, 2012, the contents of all of which are herein incorporated by reference in their entirety.

TECHNICAL FIELD

The present invention relates to a cellulose acylate film, a polarizing plate using the same and a liquid crystal display device.

BACKGROUND ART

A typical liquid crystal display device is equipped with two polarizing plates disposed in such a manner that a liquid crystal layer lies between them. The two polarizing plates are arranged so that the direction of polarization of the light is at right angles to one another. The two polarizing plates form a mechanism that controls ON/OFF (transmittance and blocking) of the light emitted from a backlight in accordance with a change of liquid-crystal molecular orientation by application of voltage. Such polarizing plates have a configuration that a polarizer is sandwiched with polarizing plate protective films such as a cellulose acylate film. The polarizer is made of a material which is a polyvinyl alcohol (PVA) crosslinked by iodine. Especially, a cellulose acylate film is favorably used for a polarizing plate protective film because of its excellent transparency and small haze.

Meanwhile, recently, inclination for large-size-screen, enhancement in the quality of image, and price reduction of the liquid crystal display device are progressing with a focus on application to TV. A demand for technology development addressing such progress is more and more increasing. It is expected for frequency of outdoor use to increase with a focus on application to digital signage or a variety of portable devices and the like in future. There is a demand for development of a liquid crystal display device that can be used even under harsher conditions than in the past and that is capable of realizing high quality image. In view of such needs, it has been pointed out that when the above-described polarizing plate is used under environment of high temperature and high humidity, display unevenness is apt to generate. The display unevenness is thought to be caused by the mechanism in which a stress resulting from shrinkage of the polarizer under conditions of high temperature and high humidity is introduced into a polarizing plate protective film whereby a change of a phase difference of the polarizing plate protective film occurs near the frame fixing the polarizing plate.

While on the other hand, addition of an acrylic resin to a cellulose ester film is proposed in order to suppress generation of depositions or the like at the time of production, and to reduce both retention and water-vapor transmission ratio (see Patent Literature 1). Further, in order to suppress humidity fluctuation of phase-difference value, there is an example of application of a compound having a furanose structure or a pyranose structure to the cellulose derivatives (see Patent Literature 2).

CITATION LIST

Patent Literatures

Patent Literature 1: JP-A-2003-12859 ("JP-A" means unexamined published Japanese patent application)
Patent Literature 2: WO2007/125764 pamphlet

SUMMARY OF THE INVENTION

Technical Problem

However, considering the current situation in which the recent product development of the liquid crystal display devices is further accelerated and both much further growth in size and diversification of application have been conducted, it is difficult to say that the method disclosed by the above-described Patent Literature 1 is more than satisfactory. Especially, through a study conducted by the present inventors, it has been found that in the method disclosed by the above-described Patent Literature 1, maintenance of quality of the polarizer has been unconsidered and its suppression property is unsatisfactory. Further, improvement in elastic modulus of the film is also desired. The present invention, therefore, aims to provide a cellulose acylate film which has transparency and optical characteristics suitable for a polarizing plate protective film, and by which deterioration of the polarizer inside can be also effectively suppressed.

Solution to Problem

The problems of the present invention can be solved by the following means.
(1) A cellulose acylate film, comprising:
   a cellulose acylate; and
   a specific polymer, the specific polymer containing a repeating unit derived from a monomer represented by formula (1):

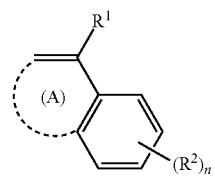

(1)

wherein $R^1$ represents a hydrogen atom or an aliphatic group having 1 to 4 carbon atoms; $R^2$ represents a substituent; (A) represents an atomic group necessary to form a 5- or 6-membered ring; and n represents an integer of 0 to 4.
(2) The cellulose acylate film described in the above item (1), wherein the specific polymer comprises a copolymer containing the repeating unit derived from the monomer represented by formula (1) and a repeating unit other than the repeating unit derived from the monomer represented by formula (1).
(3) The cellulose acylate film described in the above item (1) or (2), wherein, in formula (1) of the specific polymer, $R^1$ represents a hydrogen atom; (A) represents an atomic group necessary to form a 5-membered ring; and $R^2$ represents a hydrogen atom, a methyl group, or a hydroxyl group.
(4) The cellulose acylate film described in any one of the above items (1) to (3), wherein the repeating unit derived from the monomer represented by formula (1) is represented by the following formula (2-1), formula (2-2), formula (2-3), formula (2-4), formula (2-5), or formula (2-6);

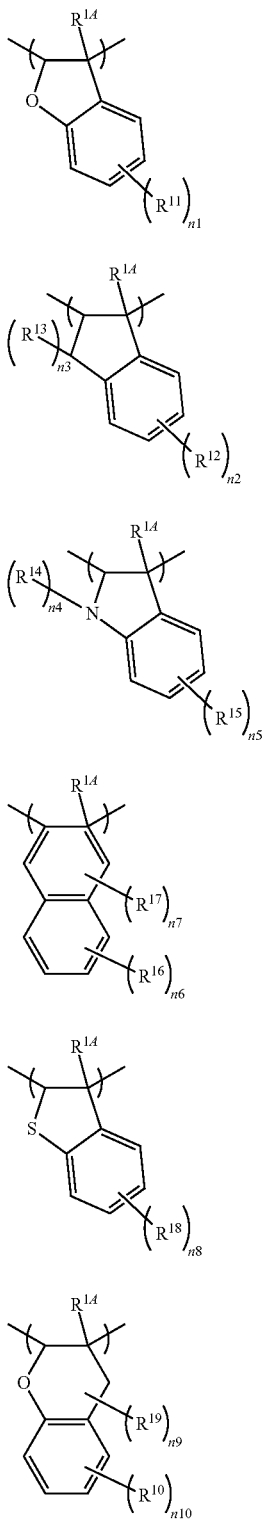

(2-1)

(2-2)

(2-3)

(2-4)

(2-5)

(2-6)

wherein, in formulae (2-1) to (2-6), $R^{10}$ to $R^{19}$ each independently represent a substituent; n1, n2, n5, n6, n8 and n10 each independently represent an integer of 0 to 4; n3, n7 and n9 each independently represent 0 to 2; n4 represents 0 or 1; and $R^{14}$ represents a hydrogen atom or an aliphatic group having 1 to 4 carbon atoms.

(5) The cellulose acylate film described in any one of the above items (1) to (3), wherein the specific polymer is a coumarone resin containing three components represented by the following formula (P-1) as repeating units;

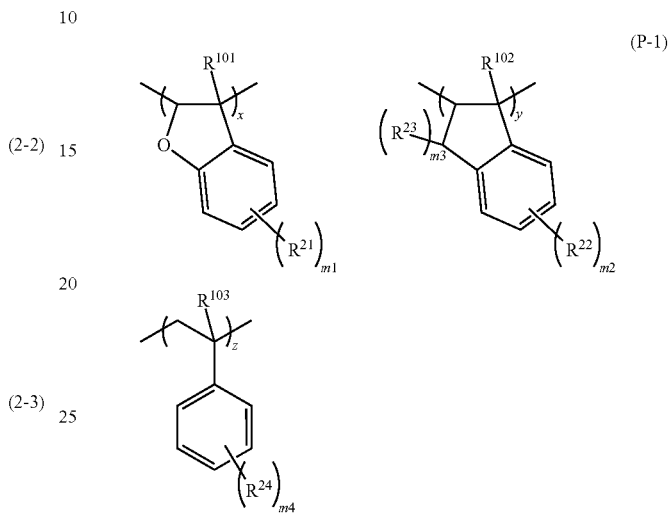

(P-1)

wherein, in formula (P-1), $R^{21}$, $R^{22}$, $R^{23}$ and $R^{24}$ each independently represent a substituent; x represents a molar ratio of 0 to 40; y represents a molar ratio of 5 to 95; z represents a molar ratio of 0 to 70; m1 and m2 represent an integer of 0 to 4; m3 represents an integer of 0 to 2; m4 represents an integer of 0 to 5; and $R^{101}$, $R^{102}$ and $R^{103}$ represent a hydrogen atom or an aliphatic group having 1 to 4 carbon atoms.

(6) The cellulose acylate film described in any one of the above items (1) to (5), wherein the weight-average molecular weight of the specific polymer is from 200 to 10,000.

(7) The cellulose acylate film described in any one of the above items (1) to (6), wherein the cellulose acylate satisfies an acyl substitution degree of the following mathematical formula:

$$1.5 \leq A \leq 3.0 \ (A\text{:acyl substitution degree}).$$

(8) The cellulose acylate film described in any one of the above items (1) to (7), wherein the cellulose acylate satisfies an acyl substitution degree of the following mathematical formula:

$$2.0 \leq A \leq 3.0 \ (B\text{:acyl substitution degree}).$$

(9) The cellulose acylate film described in any one of the above items (1) to (8), wherein the additive amount of the specific polymer is from 0.1 parts by mass to 100 parts by mass with respect to 100 parts by mass of the cellulose acylate.

(10) The cellulose acylate film described in any one of the above items (1) to (9), further comprising a polycondensation polyester compound obtained by polycondensation of a dicarboxylic acid represented by the following formula (4) with a diol represented by the following formula (5):

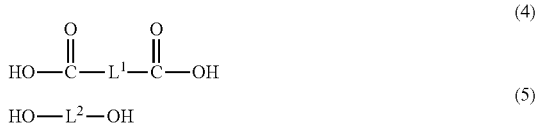

$$HO-\overset{O}{\overset{\|}{C}}-L^1-\overset{O}{\overset{\|}{C}}-OH \quad (4)$$

$$HO-L^2-OH \quad (5)$$

wherein, in formulae (4) and (5), $L^1$ is an aliphatic group having 2 to 18 carbon atoms or an aromatic group having 6 to 15 carbon atoms; $L^2$ is an aliphatic group having 2 to 8 carbon atoms; and the aliphatic group may be a straight chain or a branch.

(11) The cellulose acylate film described in the above item (10), wherein the number-average molecular weight of the polycondensation ester compound is from 500 to 2000.

(12) The cellulose acylate film described in the above item (10) or (11), wherein the terminal of the polycondensation ester compound is sealed.

(13) The cellulose acylate film described in any one of the above items (1) to (9), further containing at least one compound selected from a monosaccharide and a carbohydrate derivative composed of from 2 to 10 monosaccharide units.

(14) The cellulose acylate film described in the above item (13), wherein the carbohydrate derivative is substituted by an alkyl group, an aryl group or an acyl group.

(15) The cellulose acylate film described in the above item (13) or (14), wherein the carbohydrate derivative is substituted by an acyl group.

(16) A polarizing plate, comprising:
a polarizer; and
two protective films disposed on both sides of the polarizer, at least one of the two protective films being made of the cellulose acylate film described in any one of the above items (1) to (15).

(17) A liquid crystal display device, comprising:
a liquid crystal cell; and
two polarizing plates disposed on both sides of the liquid crystal cell, at least one of the polarizing plates being made of the polarizing plate described in the above item (16).

Advantageous Effects of Invention

The film of the present invention exerts preferred effects such that the film has transparency and exhibits optical characteristics suitable for a polarizing plate protective film and excels in both resistance to moisture transmission and inhibition of dissipation of boron, whereby deterioration of the polarizer inside can be effectively suppressed.

BRIEF DESCRIPTION OF THE DRAWING

FIG. 3 is an explanatory drawing schematically showing a molecular constitution inside of the film as a preferable embodiment of the present invention.

Figure 1:
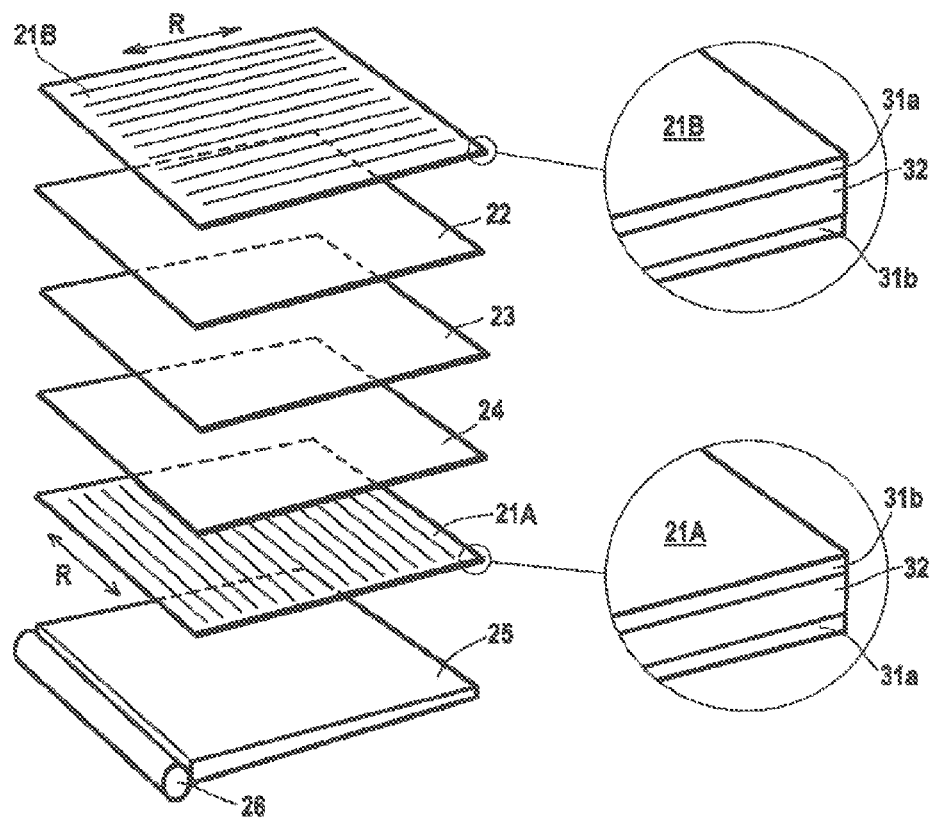
FIG. 1 is an exploded perspective view schematically showing an internal structure of a liquid crystal display device.

Other and further features and advantages of the invention will appear more fully from the following description.

MODE FOR CARRYING OUT THE INVENTION

The cellulose acylate film of the present invention contains cellulose acylate (a) and the following specific polymer (b).

Especially, the polymer (hereinafter, referred to as the specific polymer) containing a repeating unit derived from a monomer represented by formula (1), which has an aromatic ring of specific skeleton, plays an important role in the present invention. That is, employment of the cellulose acylate film of the present invention as a protective film for polarizing plate makes it possible to maintain good optical characteristics including high transparency and to achieve degradation control of the polarizer at a high level at the same time. As for the reason, there are still unexplained points. If allowed by inclusion of presumption, the reason will be given below.

That is, it is thought that when the specific polymer is blended and formed in the shape of a film together with the cellulose acylate, the specific polymer fills in a free volume of the cellulose acylate inside, whereby elastic modulus is improved and also a rigid hydrophobic field which maintains resistance to moisture transmission even under the conditions of high temperature and high humidity is formed inside the film (see FIG. 3). Further, the important herein is that not only moisture transmission has been suppressed simply, but also diffusion migration of boron seems to have been suppressed at the same time. That is, it is thought that in addition to prevention from destruction of the crosslinking structure through boron inside the poralizer due to suppression of penetration of moisture, suppression of dissipation of boron at the same time contributes to prevention of time degradation of the polarizer. Hereinafter, the present invention is described in detail on the basis of its preferable embodiment.

[Specific Polymer]

The cellulose acylate film of the present invention contains a polymer containing a repeating unit derived from a monomer represented by formula (1).

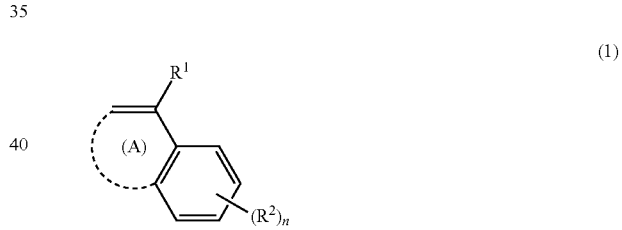

$R^1$

In formula (1), $R^1$ represents a hydrogen atom or an aliphatic group having 1 to 4 carbon atoms. $R^1$ is not particularly limited, but preferably a hydrogen atom, a methyl group, or an ethyl group.

$R^2$ $R^2$ represents a substituent group, and, as the substituent group, an aliphatic group or an aromatic group is preferred.

$R^2$ is not particularly limited. However, as the aliphatic group, an alkyl group, an alkenyl group, an alkynyl group, and a cycloalkyl group are preferable. An alkyl group having 1 to 6 carbon atoms is more preferable. A methyl group, an ethyl group, a propyl group, and a butyl group are still more preferable. A methyl group and a t-butyl group are especially preferable. As the aromatic group, a phenyl group, a naphthyl group, and a biphenyl group are preferable. A phenyl group is especially preferable.

n n represents an integer of 0 to 4, preferably from 0 to 2, and more preferably from 0 to 1. When n is 0, it means that the substituent $R^2$ does not exist. However, in this case, it means that a hydrogen atom exists in the chemical formula. Also in the other chemical formulae in the present specification, the chemical structures are commensurately construed in the same manner as the above.

(A)

(A) represents an atomic group necessary to form a 5- or 6-membered ring, and preferably an atomic group necessary to form a 5- or 6-membered aromatic ring. In the present specification, the aromatic ring is in accordance with concept including a hetero-atom-free aromatic ring and a hetero-atom-containing saturated or unsaturated hetero ring.

In the present invention, the repeating unit derived from the monomer represented by formula (1) is preferably represented by the following formula (2-1), formula (2-2), formula (2-3), formula (2-4), formula (2-5), or formula (2-6).

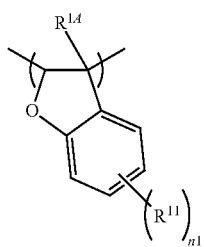

(2-1)

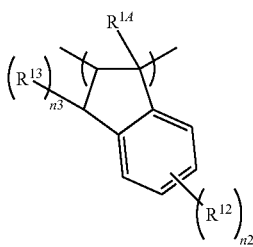

(2-2)

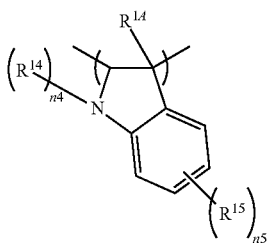

(2-3)

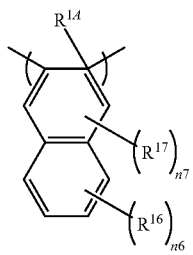

(2-4)

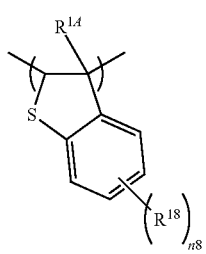

(2-5)

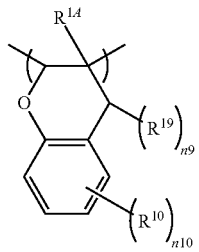

(2-6)

$R^{10}$ to $R^{19}$

In formulae (2-1) to (2-6), $R^{10}$ to $R^{19}$ each independently represent a substituent.

The substituent is not particularly limited, but the following substituent T is exemplified. A preferable range of the substituent is also the same as that of the substituent T.

n1 to n10 n1, n2, n5, n6, n8 and n10 each independently represent an integer of 0 to 4, and preferably from 0 to 2. n3, n7 and n9 each independently represent 0 to 2, and preferably from 0 to 1. n4 represents 0 or 1, and preferably 0.

$R^{14}$ $R^{14}$ represents a hydrogen atom or an aliphatic group having 1 to 4 carbon atoms. $R^{14}$ is not particularly limited, but a hydrogen atom, a methyl group or an ethyl group are preferred.

In the present invention, the specific polymer is preferably a coumarone resin containing three components represented by the following formula (P-1) as repeating units. Herein, the coumarone resin means a collective term of copolymers composed of any one of or all of coumarone/indene/styrene in addition to copolymers which are synthesized from a petroleum residue and has a specific copolymerization ratio. The copolymers represented by the following formula (P-1), therefore, fall into a category of the coumarone resin.

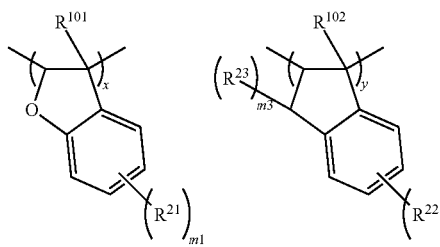

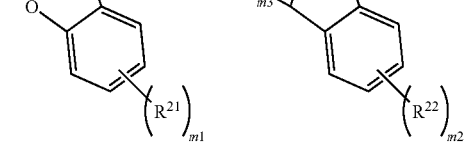

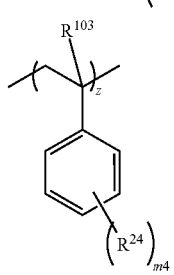

(P-1)

$R^{21}$ to $R^{24}$ $R^{21}$, $R^{22}$, $R^{23}$ and $R^{24}$ each independently represent a substituent. The substituent is not particularly limited, but the following substituent T is exemplified. A preferable range of the substituent is also the same as that of the substituent T.

$R^{101}$ to $R^{103}$ $R^{101}$ to $R^{103}$ represent a hydrogen atom or an aliphatic group having 1 to 4 carbon atoms. $R^{101}$ to $R^{103}$ are not particularly limited, but a hydrogen atom, a methyl group and an ethyl group are preferred.

x, y and z x represents a molar ratio of 0 to 40, preferably from 0 to 30, and more preferably from 0 to 20. y represents a molar ratio of 5 to 95, preferably from 10 to 90, and more preferably from 30 to 90. z represents a molar ratio of 0 to 70, preferably from 0 to 60, and more preferably from 0 to 50. A total of x, y and z is not necessary to be 100 (mole %), but when the total is less than 100, it means that other copolymer component(s) exists therein. Examples of the other copolymer component(s) include vinyl toluene, isopropenyl toluene, α-methyl styrene, alkylindenes, and dicyclopentadiene. The copolymerization ratio t of the other copolymer component(s) is preferably from 0 to 30, and more preferably from 0 to 20.

m1 to m4 m1 and m2 represent an integer of 0 to 4, and preferably from 0 to 2. m3 represents an integer of 0 to 2, and preferably 0. m4 represents an integer of 0 to 5, preferably from 0 to 3, and more preferably from 0 to 1.

The terminal group of the specific polymer may be any group, and typically a structure in which polymerization has been terminated by addition of a hydrogen atom to the vinyl group.

Hereinafter, specific examples of the specific polymer having the repeating unit represented by formula (1) are shown. However, the present invention is not construed to be limited to them. The following structural formulae show chemical structures of the repeating units of main components and their constituent ratios, and as described above, other component(s) may be contained therein.

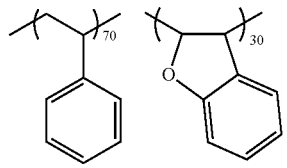
(P-01)

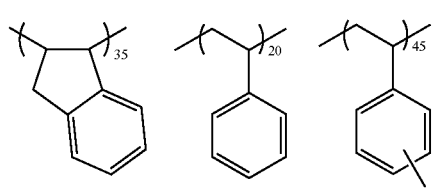
(P-02)

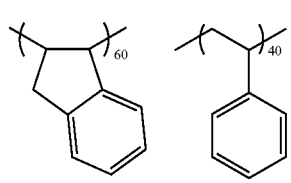
(P-03)

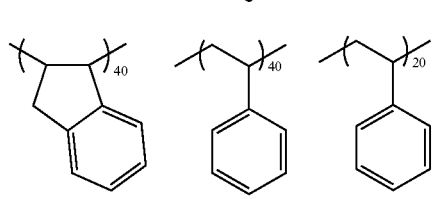
(P-04)

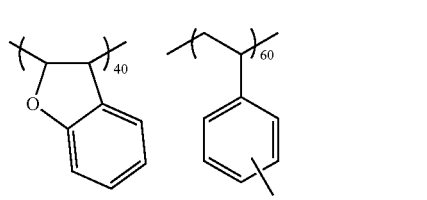
(P-05)

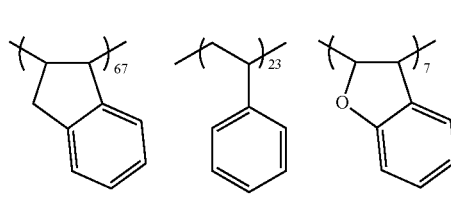
(P-06)

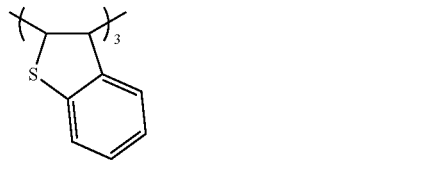
(P-07)

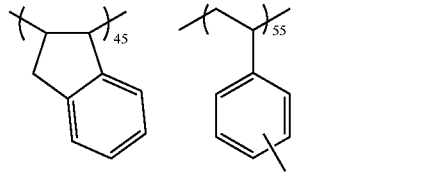
(P-08)

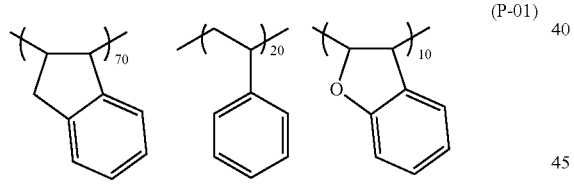
(P-09)

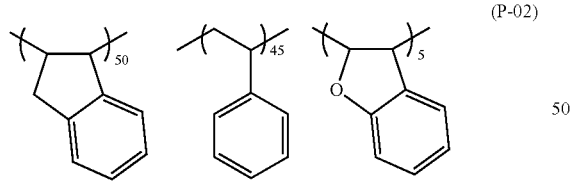
(P-10)

(P-011)

(P-12)

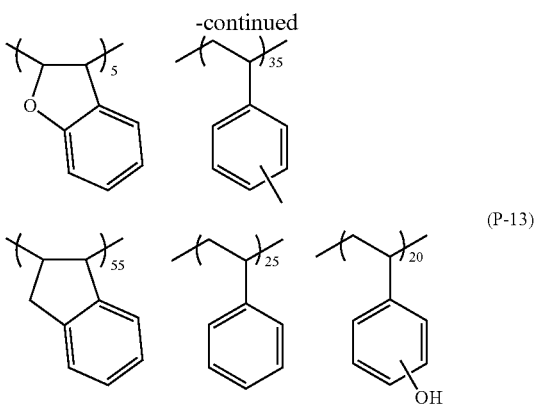

(P-13)

The number represents a molar ratio.
(Weight-Average Molecular Weight)

The weight-average molecular weight of the specific polymer is preferably from 200 to 10,000, more preferably from 300 to 8,000, and most preferably from 400 to 4,000. When the molecular weight is above the lower limit, an effect of efficiently suppressing the water-vapor transmission ratio and water content ratio of the film can be expected. Meanwhile, when the molecular weight is below the upper limit, improvement of compatibility with cellulose acylate can be expected.

Unless it is explicitly stated otherwise, the molecular weight and the degree of dispersion are values obtained by GPC measurement (Gel Permeation Chromatography). The molecular weight is defined as polystyrene-converted mass-average molecular weight. The gel charged into the column used in the GPC method is preferably a gel having an aromatic compound as a repeating unit, and examples thereof include a gel including styrene-divinylbenzene copolymers. The column is preferably used in the form where 2 to 6 columns are connected. Examples of a solvent used include ether-based solvents such as tetrahydrofuran and the like, and amide-based solvents such as N-methylpyrrolidinone and the like. The measurement is preferably carried out at a flow rate of the solvent in the range of 0.1 to 2 mL/min, and most preferably in the range of 0.5 to 1.5 mL/min. By carrying out the measurement within these ranges, there is no load on an apparatus, and thus, the measurement can be carried out further efficiently. The measurement temperature is preferably carried out at 10° C. to 50° C., and most preferably at 20° C. to 40° C. A column and a carrier to be used can be properly selected, according to the property of a polymer compound to be measured.

(Additive Amount)

The additive amount of the specific polymer is not particularly limited, but preferably from 0.1 parts by mass to 100 parts by mass, more preferably from 0.5 parts by mass to 50 parts by mass, and especially preferably from 1.0 parts by mass to 30 parts by mass, with respect to 100 parts by mass of the cellulose acylate. When the additive amount is above the lower limit, an effect of efficiently reducing both water-vapor transmission ratio and water content ratio of the film can be expected. Meanwhile, when the additive amount is below the upper limit, maintenance of high transparency can be expected. The specific polymer may be used singly, or in combination of two or more kinds. Even without any specific indication, each of the components contained in the cellulose acylate film of the present invention may be used singly, or in combination of two or more kinds.

In the present specification, the term "polymer" or "polymeric substance" is meant to include an oligomer that is a compound having a molecular weight of several hundreds in which, for example, several monomers have been polymerized, in addition to a polymer that is an ordinary high-molecular compound in which a lot of monomers have been polymerized. Further, the term "polymer" or "polymeric substance" is meant, unless otherwise indicated, to include "copolymer" or "copolymeric substance".

In the present specification, when the name of a chemical is called by putting the term "compound" at the foot of the chemical name, or when the chemical is shown by a specific name or a chemical formula, a showing of the compound is used to mean not only the compound itself, but also a salt, complex or ion thereof and the like. Further, the showing of the compound is also used to mean incorporation of derivatives modified by a predefined configuration to an extent necessary to obtain a desired effect. Further, in the present specification, when a specific atomic group is called by putting the term "group" at the foot of the specific atomic group with respect to the substituent, the group means that the group may have further an arbitrary substituent. This is also applied to a compound in which substitution or non-substitution is not explicitly stated. Examples of preferable substituents include the following substituent T.

The substituents T include an alkyl group (preferably an alkyl group having 1 to 20 carbon atom(s), for example, methyl, ethyl, isopropyl, t-butyl, pentyl, heptyl, 1-ethylpentyl, benzyl, 2-ethoxyethyl, and 1-carboxymethyl), an alkenyl group (preferably an alkenyl group having 2 to 20 carbon atoms, for example, vinyl, allyl, and oleyl), an alkynyl group (preferably an alkynyl group having 2 to 20 carbon atoms, for example, ethynyl, butadiynyl, and phenylethynyl), a cycloalkyl group (preferably a cycloalkyl group having 3 to 20 carbon atoms, for example, cyclopropyl, cyclopentyl, cyclohexyl, and 4-methylcyclohexyl), an aryl group (preferably an aryl group having from 6 to 26 carbon atoms, for example, phenyl, 1-naphthyl, 4-methoxyphenyl, 2-chlorophenyl, and 3-methylphenyl), a heterocyclic group (preferably a heterocyclic group having 2 to 20 carbon atoms, for example, 2-pyridyl, 4-pyridyl, 2-imidazolyl, 2-benzimidazolyl, 2-thiazolyl, and 2-oxazolyl), an alkoxy group (preferably an alkoxy group having 1 to 20 carbon atom(s), for example, methoxy, ethoxy, isopropyloxy, and benzyloxy), an aryloxy group (preferably an aryloxy group having from 6 to 26 carbon atoms, for example, phenoxy, 1-naphthyloxy, 3-methylphenoxy, and 4-methoxyphenoxy), an alkoxycarbonyl group (preferably an alkoxycarbonyl group having 2 to 20 carbon atoms, for example, ethoxycarbonyl and 2-ethylhexyloxycarbonyl), an amino group (preferably an amino group having 0 to 20 carbon atom(s), for example, amino, N,N-dimethylamino, N,N-diethylamino, N-ethylamino, and anilino), a sulfonamide group (preferably a sulfonamide having 0 to 20 carbon atom(s), for example, N,N-dimethylsulfonamide, and N-phenylsulfonamide), an acyloxy group (preferably an acyloxy group having 1 to 20 carbon atom(s), for example, acetyloxy and benzoyloxy), a carbamoyl group (preferably a carbamoyl group having 1 to 20 carbon atom(s), for example, N,N-dimethylcarbamoyl and N-phenylcarbamoyl), an acylamino group (preferably an acylamino group having 1 to 20 carbon atom(s) for example, acetylamino and benzoylamino), a cyano group, and a halogen atom (for example, a fluorine atom, a chlorine atom, a bromine atom, and an iodine atom). Among them, an alkyl group, an alkenyl group, an aryl group, a heterocyclic group, an alkoxy group, an aryloxy group, an alkoxycarbonyl group, an amino group, an acylamino group, a cyano group, and a halogen atom are more preferable. An alkyl group, an alkenyl group, a heterocyclic group, an alkoxy group, an alkoxycarbonyl group, an amino group, an acylamino group, and a cyano group are particularly preferable.

<Cellulose Acylate>

Next, the cellulose acylate is explained in detail below.

As the cellulose usable as a raw material of the cellulose acylate for use in the cellulose acylate film in the present invention, use can be made of cotton linter and wood pulp (e.g., broadleaf pulp, and conifer (needleleaf) pulp). Any cellulose acylate obtained from any raw cellulose may be used, and a plurality of celluloses may be used in combination according to the need. There are detailed descriptions of these raw celluloses in, for example, "Plastic Material Lectures (17) Cellulose Resin" (Marusawa and Uda, The Nikkan Kogyo Shimbun, Ltd., published in 1970), and Japan Institute of Invention and Innovation, "Hatsumei Kyokai Kokai Gihou" (Journal of Technical Disclosure) (Kogi No. 2001-1745, Japan Institute of Invention and Innovation), pp. 7 to 8; and the raw celluloses described in these publications may be used in the present invention.

One type alone or two or more different types of acyl groups may be used in the cellulose acylate for use in the cellulose acylate film of the present invention. Preferably, the cellulose acylate for use in the cellulose acylate film has an acyl group having 2 to 4 carbon atoms as a substituent. In the case where the cellulose acylate has two or more different types of acyl groups, one of them is preferably an acetyl group, and as the acyl group having 2 to 4 carbon atoms, preferred is a propionyl group or a butyryl group. By employing these cellulose acylates, a solution of good solubility can be produced, and especially in a chlorine-free organic solvent, a good solution can be produced. In addition, a solution having a low viscosity and having good filterability can be produced.

Description will first be made in detail of the cellulose acylate preferably used in the present invention. Each of the glucose units, which constitute cellulose by bonding through β-1,4-glycoside bond, has free hydroxyl groups at the 2-, 3-, and 6-positions thereof. A cellulose acylate is a polymer obtained by acylating a part or the whole of these hydroxyl groups with an acyl group(s). The "degree of acyl substitution" as referred to herein means the total ratio of acylation of the 2-, 3- and 6-positioned hydroxyl groups in cellulose (100% acylation at each position is represented by a degree of substitution of 1).

The degree of acyl substitution (A) of the cellulose acylate is preferably 1.5 to 3 (1.5≤A≤3.0), more preferably from 2.0 to 3.0, further more preferably from 2.0 to 2.97, further more preferably from 2.5 to less than 2.97, and even more preferably from 2.70 to 2.95.

The acyl group having 2 or more carbon atoms in the cellulose acylate may be an aliphatic group or an aromatic group, and are not particularly limited. The cellulose acylate may be an alkylcarbonyl ester of cellulose, an alkenylcarbonyl ester of cellulose, an aromatic carbonyl ester of cellulose or an aromatic alkylcarbonyl ester of cellulose. These esters may further have a substituent. Preferable examples of the acyl group include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an isobutanoyl group, a tert-butanoyl group, a cyclohexanecarbonyl group, an oleoyl group, a benzoyl group, a naphthylcarbonyl group, and a cinnamoyl group. Among these, an acetyl group, a propionyl group, a butanoyl group, a dodecanoyl group, an octadecanoyl group, a tert-butanoyl group, an oleoyl group, a benzoyl group, a naphthylcarbonyl group, and a cinnamoyl group are more preferred; an acetyl group, a propionyl group and a butanoyl group (i.e. the case where the acyl group has from 2 to 4 carbon atoms) are particularly preferred; and the most preferred is an acetyl group (i.e. the case where the cellulose acylate is a cellulose acetate).

In acylation of cellulose, when an acid anhydride or an acid chloride is used as an acylating agent, an organic acid, such as acetic acid, or methylene chloride or the like is used as an organic solvent as a reaction solvent.

When the acylating agent is an acid anhydride, the catalyst is preferably a protic catalyst such as sulfuric acid; and when the acylating agent is an acid chloride (e.g., $CH_3CH_2COCl$), a basic compound may be used as the catalyst.

The most general industrial production method for a mixed fatty acid ester of cellulose is a method of acylating cellulose with a fatty acid corresponding to an acetyl group or any of other acyl groups (e.g., acetic acid, propionic acid, valeric acid, etc.), or with a mixed organic acid component containing their acid anhydride.

The cellulose acylate can be synthesized, for example, according to the method described in JP-A-10-45804.

The film of the present invention preferably contains, in the total solid content, from 5% by mass to 99% by mass of the cellulose acylate from the viewpoint of water-vapor transmission ratio, more preferably from 20% by mass to 99% by mass, and especially preferably from 50% by mass to 95% by mass.

<Other Additives>

To the above-described cellulose acylate film, it is possible to add additives, such as a polycondensation polymer, a retardation controlling agent (retardation developing agent and retardation reducing agent); a plasticizer such as a phthalic acid ester or a phosphoric acid ester; an ultraviolet absorbing agent; an antioxidant; and a matting agent, as an additive other than the above specific polymer.

(Polycondensation Polymer)

From the viewpoint of reduction in haze, it is preferable for the above-described cellulose acylate film to contain a polycondensation polymer.

Ordinary high molecular weight additives known as additives for cellulose acylate films are widely employable as the polycondensation polymer. The amount of the additive is preferably from 1 to 35 parts by mass, more preferably from 4 to 30 parts by mass, even more preferably from 10 to 25 parts by mass with respect to 100 parts by mass of the cellulosic resin.

The high molecular weight additive for use in the above-described cellulose acylate film as the polycondensation polymer is a compound having a repeating unit therein, preferably having a number-average molecular weight of from 700 to 10,000. The high molecular weight additive also serves to promote the solvent vaporization speed and to reduce the residual solvent amount, in a solution casting process. Further, the high molecular weight additive shows useful effects, from the viewpoint of film modification, for example, enhancing the mechanical properties of the film, imparting flexibility and water absorption resistance to the film and reducing the water-vapor transmission ratio of the film.

The high molecular weight additive for use in the present invention as the polycondensation polymer preferably has a number-average molecular weight from 700 to 8,000, more preferably from 700 to 5,000, and particularly preferably 1,000 to 5,000.

Description will be made in detail of the high molecular weight additives for use in the present invention as a polycondensation polymer with reference to the specific examples. Needless to say, the high molecular weight additives for use in the present invention as the polycondensation polymer are not limited thereto.

Further, the polycondensation polymer is preferably an ester compound of non-phosphoric ester type. In this description, the "ester compound of non-phosphoric ester type" means "a compound that is an ester but is not a phosphoric-ester".

The high molecular additive of the polycondensation polymer includes polyester polymers (aliphatic polyester polymers, aromatic polyester polymers, etc.), and copolymers of a polyester component and any other component. Preferred are aliphatic polyester polymers, aromatic polyester polymers, copolymers of a polyester polymer (aliphatic polyester polymer, aromatic polyester polymer, etc.) and an acrylic polymer; and copolymers of a polyester polymer (aliphatic polyester polymer, aromatic polyester polymer, etc.) and a styrenic polymer; and more preferred are polyester compounds having at least one aromatic ring as a copolymerization component.

The aliphatic polyester polymer is one obtained by a reaction of an aliphatic dicarboxylic acid having from 2 to 20 carbon atoms and at least one diol selected from the group consisting of aliphatic diols having from 2 to 12 carbon atoms and alkyl ether diols having from 4 to 20 carbon atoms. Both ends of the reaction product maybe remained as the original product has, or a so-called terminal-blocking may be conducted by further reaction with monocarboxylic acids, monoalcohols or phenols. The terminal blocking maybe effected for the reason that the absence of a free carboxylic acid is effective for improved storability and the like. The dicarboxylic acid for the polyester polymer for use in the present invention is preferably an aliphatic dicarboxylic acid having from 4 to 20 carbon atoms, or an aromatic dicarboxylic acid having from 8 to 20 carbon atoms.

For the aromatic polyester polymer in this invention, it is preferable to use a combination of at least one aromatic dicarboxylic acid and at least one aromatic diol as the above-mentioned polyester, and the combination mode is not specifically limited. Different types of components may be combined in any desired mode. In the present invention, especially preferred is the polymer additive terminated with an alkyl group or an aromatic group, as described above. For the termination, employable is the above-mentioned method.
(Retardation Reducing Agent)

As the retardation reducing agent in the present invention, widely employable are ester-based compounds belonging to phosphoric acid series and compounds other than non-phosphoric-ester compounds that are known as additives for cellulose acylate films.

The polymer-type retardation reducing agent may be selected from phosphate-based polyester polymers, styrenic polymers, acrylic polymers, and their copolymers; and acrylic polymers and styrenic polymers are preferred. Preferably, the retardation reducing agent contains at least one kind of polymer having a negative intrinsic birefringence, such as styrenic polymer and acrylic polymer.

Examples of the low molecular weight retardation reducing agent that is a compound other than non-phosphoric-ester compounds include the following. These may be a solid or an oily substance. In other words, they are not specifically limited in point of the melting point or boiling point thereof. For example, mentioned are a mixture of an UV-absorbent material having a melting point of 20° C. or lower and an UV-absorbent material having a melting point of 20° C. or higher, as well as a mixture of antiaging agents similarly selected. Further, mentioned are IR absorbing dyes described in, for example, JP-A-2001-194522. The additive may be added in any stage of preparing the cellulose acylate solution (dope); and the additive may be added at the end of the dope preparation process or in the final step for additive addition of the process. The amount of the material is not specifically limited so far as the material could exhibit its function.

The low molecular weight retardation reducing agent that is a compound other than non-phosphoric-ester compounds is not specifically limited. For example, the compounds are described in detail in JP-A-2007-272177, paragraphs [0066] to [0085].

The compounds represented by formula (1) in JP-A-2007-272177, paragraphs [0066] to [0085] may be produced according to the following method.

The compounds of formula (1) in the patent publication can be obtained by condensation reaction of a sulfonyl chloride derivative and an amine derivative.

The compounds of formula (2) in JP-A-2007-272177 can be obtained by dehydrating condensation reaction of carboxylic acids and amines with a condensing agent (e.g., dicyclohexylcarbodiimide (DCC), etc.), or by substitution reaction of a carboxylic acid chloride derivative and an amine derivative.

The retardation reducing agent is preferably an Rth reducing agent from the viewpoint of realizing a favorable Nz factor. Of the retardation reducing agents, examples of the Rth reducing agent include, for example, acrylic polymers, styrenic polymers, and low molecular weight compounds of formulae (3) to (7) of JP-A-2007-272177. Of those, preferred are acrylic polymers and styrenic polymers; and more preferred are acrylic polymers.

The retardation reducing agent is added in an amount of preferably from 0.01 to 30 parts by mass, more preferably from 0.1 to 20 parts by mass, still more preferably from 0.1 to 10 parts by mass, with respect to 100 parts by mass of the cellulose resin.

By controlling the above additive amount not more than the above upper limit, compatibility with the cellulose resin can be improved and whitening can be inhibited. When two or more retardation reducing agents are used, the sum amount of the agents is preferably within the above range.
(Retardation Developing Agent)

In the above-described cellulose acylate film, at least one kind of retardation developing agents is preferably added to develop a retardation value. Not specifically limited, but examples of the retardation developing agent include rod-shaped compounds, discotic compounds and compounds having retardation developing property among the non-phosphoric ester compounds. Of the rod-shaped or discotic compounds, those having at least two aromatic rings are preferred for use as the retardation developing agent.

The amount of the retardation developing agent of a rod-shaped compound to be added is preferably from 0.1 to 30 parts by mass relative to 100 parts by mass of the cellulose acylate-containing polymer component, more preferably from 0.5 to 20 parts by mass. Preferably, the amount of a discotic compound contained in the retardation developing agent is preferably less than 3 parts by mass relative to 100 parts by mass of the cellulose acylate, more preferably less than 2 parts by mass, even more preferably less than 1 part by mass.

A discotic compound is superior to a rod-shaped compound in the point of Rth retardation developing property, and is therefore favorably used in the case where the film requires an especially large Rth retardation. Two or more different types of retardation developing agents may be combined for use herein.

Preferably, the retardation developing agent has a maximum absorption in a wavelength region of from 250 to 400 nm, and does not substantially have any absorption in a visible light region.

Details of the retardation developing agent are described in page 49 of Koukai Gihou 2001-1745.

(Plasticizer)

Many compounds known as a plasticizer for cellulose acylate may be used for the present invention as the plasticizer. As the plasticizer, a phosphoric acid ester or a carboxylic acid ester, a carbohydrate derivative and the like can be used. Examples of the phosphoric acid ester include triphenyl phosphate (TPP) and tricresyl phosphate (TCP). Representative examples of the carboxylic acid ester include a phthalic acid ester and a citric acid ester. Examples of the phthalic acid ester include dimethyl phthalate (DMP), diethyl phthalate (DEP), dibutyl phthalate (DBP), dioctyl phthalate (DOP), diphenyl phthalate (DPP), and diethylhexyl phthalate (DEHP). Examples of the citric acid ester include triethyl O-acetylcitrate (OACTE), and tributyl O-acetylcitrate (OACTB). Examples of other carboxylic acid ester include butyl oleate, methyl acetyl ricinoleate, dibutyl sebacate, and various trimellitic acid esters. A phthalate-series plasticizer (DMP, DEP, DBP, DOP, DPP, or DEHP) can be preferably used, and DEP and DPP are particularly preferred.

As the carbohydrate derivative, monosaccharides or derivatives of carbohydrates including from 2 to 10 monosaccharide units (hereinafter, also referred to as carbohydrate derivative-based plasticizer) are preferred.

Examples of the above described carbohydrate derivative-based plasticizer include maltose octaacetate, cellobiose octaacetate, sucrose octaacetate, sucrose acetate isobutyrate, xylose tetrapropionate, glucose pentapropionate, fructose pentapropionate, mannose pentapropionate, galactose pentapropionate, maltose octapropionate, cellobiose octapropionate, sucrose octapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate. However, the carbohydrate derivative-based plasticizers which can be used in the present invention are not limited to the above materials. These plasticizers may be used singly, or in combination of two or more kinds.

<Hydrophobizing Agent>

The cellulose acylate film of the present invention preferably contains at least one hydrophobizing agent selected from the group consisting of a polyvalent alcohol ester-based hydrophobizing agent, a polycondensation ester-based hydrophobizing agent and a carbohydrate derivative-based hydrophobizing agent. It is preferable that the hydrophobizing agent is able to reduce water content ratio while minimizing reduction in glass transition temperature (Tg) of the film. When these hydrophobizing agents are used, they make it possible to suppress diffusion of additives in the cellulose acylate film to a polarizer layer under the conditions of high temperature and high humidity, whereby deterioration of polarizer performances can be improved. Hereinafter, hydrophobizing agents used in this invention are described in detail.

(Polyvalent Alcohol Ester-Based Hydrophobizing Agent)

A polyvalent alcohol that is used in the present invention is represented by the following formula (6).

     formula (6)

($R_1$ represents an n-valent organic group, and n represents a positive integer of 2 or greater.)

As a preferable polyvalent alcohol-based hydrophobizing agent, for example, the following compounds are exemplified. However, the present invention is not limited thereto. Examples thereof include adonitol, arabitol, ethyleneglycol, diethyleneglycol, triethyleneglycol, tetraethyleneglycol, 1,2-propane diol, 1,3-propane diol, dipropyleneglycol, tripropyleneglycol, 1,2-butane diol, 1,3-butane diol, 1,4-butane diol, dibutyleneglycol, 1,2,4-butane triol, 1,5-pentane diol, 1,6-hexane diol, hexane triol, galactitol, mannitol, 3-methylpentane-1,3,5-triol, pinacol, sorbitol, trimethylol propane, trimethylol ethane, and xylitol. Especially, triethyleneglycol, tetraethyleneglycol, dipropyleneglycol, tripropyleneglycol, sorbitol, trimethylol propane, and xylitol are preferred.

Among the above polyvalent alcohol ester-based hydrophobizing agents, a polyvalent alcohol ester using a polyvalent alcohol having 5 or greater carbon atoms is preferred. Particularly preferably, the carbon number of the polyvalent alcohol is from 5 to 20.

The monocarboxylic acid used for the polyvalent alcohol ester is not particularly limited, and it is possible to use a known aliphatic monocarboxylic acid, alicyclic monocarboxylic acid, aromatic monocarboxylic acid and the like. When the alicyclic monocarboxylic acid or the aromatic monocarboxylic acid is used, it is preferable from the viewpoint of improving water-vapor transmission properties and retention.

As for the examples of the monocarboxylic acid that is used for polyvalent alcohol ester, the following compounds are exemplified. However, the present invention is not limited thereto.

As for the aliphatic monocarboxylic acid, preferred are linear fatty acids or fatty acids having a side chain, each of which has 1 to 32 carbon atoms. The number of carbon atom thereof is more preferably from 1 to 20, and particularly preferably from 1 to 10. Incorporation of acetic acid is preferable because compatibility with a cellulose derivative is increased. It is also preferable that acetic acid and another monocarboxylic acid are mixed to use them.

Preferable examples of the above-described aliphatic monocarboxylic acid include: saturated fatty acids such as acetic acid, propionic acid, butyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachidic acid, behenic acid, rigniceric acid, cerotic acid, heptacosanic acid, montanic acid, melisic acid and lacceric acid; and unsaturated fatty acids such as undecylenic acid, oleic acid, sorbic acid, linolic acid, linolenic acid and arachidonic acid.

Preferable examples of the above-described alicyclic monocarboxylic acid include cyclopentane carboxylic acid, cyclohexane carboxylic acid, cyclooctane carboxylic acid, and their derivatives.

Preferable examples of the above-described aromatic monocarboxylic acid include benzoic acid, those acids such as toluic acid and the like, in which an alkyl group is introduced into the benzene ring of benzoic acid, aromatic monocarboxylic acids having two or more benzene rings, such as biphenyl carboxylic acid, naphthalene carboxylic acid and tetralin carboxylic acid, and their derivatives. Especially, benzoic acid is preferred.

Although the molecular weight of the polyvalent alcohol ester-based hydrophobizing agent is not particularly limited, the molecular weight is preferably from 300 to 3000, and more preferably from 350 to 1500. In terms of difficulty of evaporation, a greater molecular weight is more preferable;

on the other hand, in terms of moisture permeability and compatibility with the cellulose acylate, a smaller molecular weight is more preferable.

The carboxylic acid used for the polyvalent alcohol ester may be one kind or a mixture of two or more kinds thereof. Further, the hydroxyl group of the polyvalent alcohol may be entirely esterified, or a part of the hydroxyl groups may be remained without esterification.

Hereinafter, specific compounds of the polyvalent alcohol ester are shown.

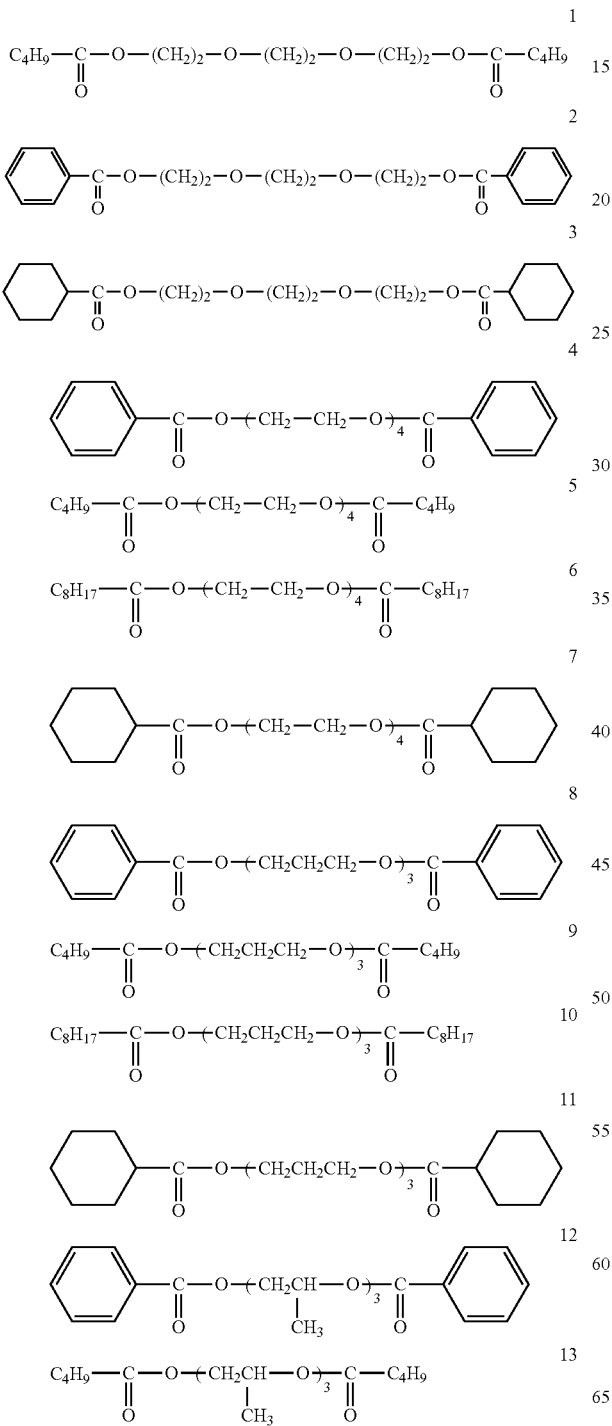

21
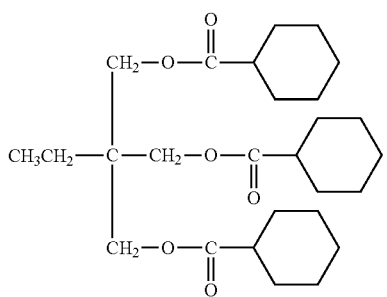
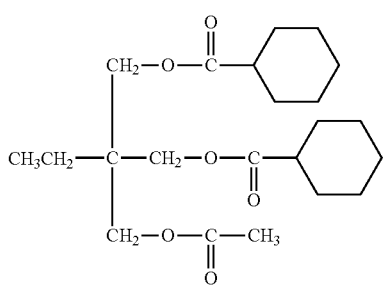
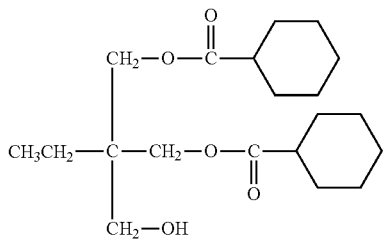
24
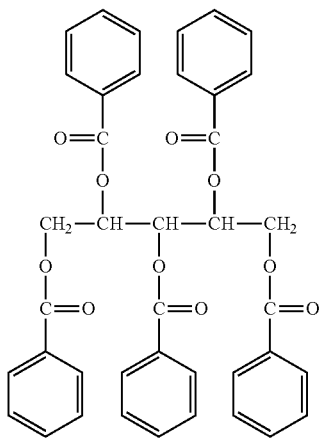
22
21
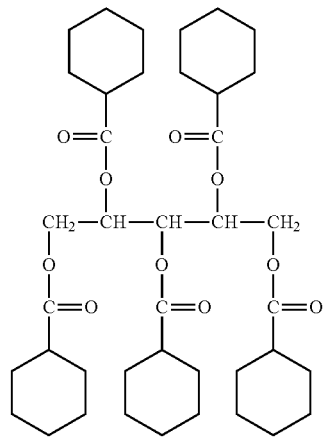
22
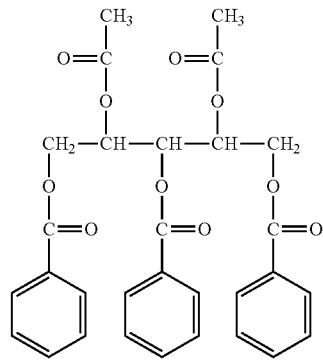
23
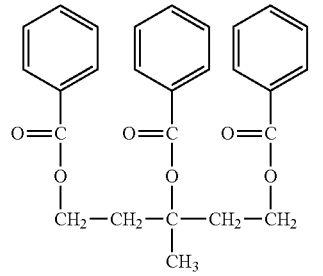
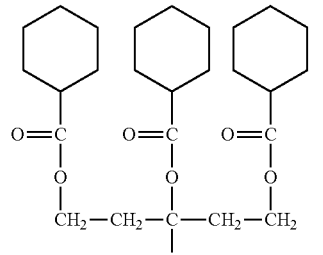
25
26
27
28
29
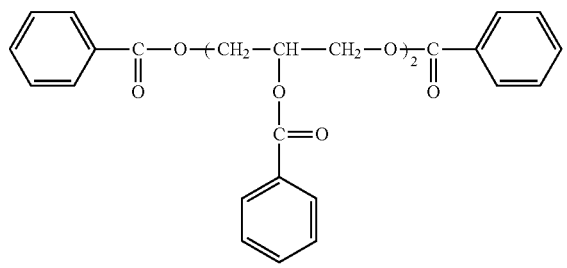

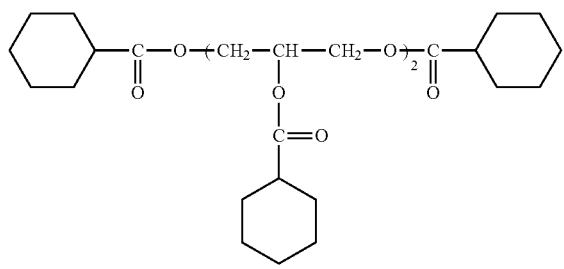

30

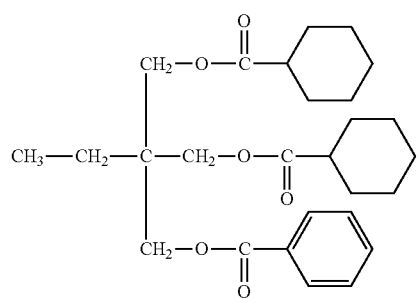

31

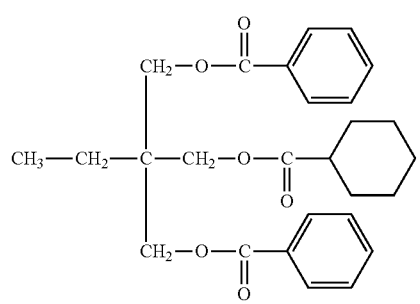

32

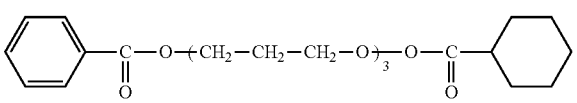

33

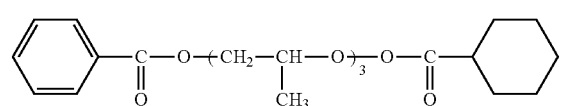

34

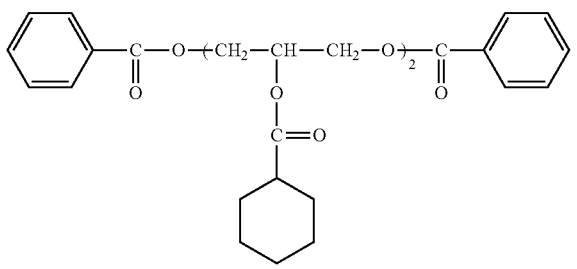

35

(Polycondensation Ester-Based Hydrophobizing Agent)

The polycondensation ester-based hydrophobizing agent is preferably obtained from at least one dicarboxylic acid having an aromatic ring (hereinafter, also referred to as "an aromatic dicarboxylic acid") and at least one aliphatic diol having an average carbon number of from 2.5 to 8.0. Further, it is also preferably obtained from a mixture of the aromatic dicarboxylic acid and at least one aliphatic dicarboxylic acid, and at least one aliphatic diol having an average carbon number of from 2.5 to 8.0.

An average carbon number of the above-described dicarboxylic acid residue is calculated separately from that of a diol residue.

The calculated value of the constituent carbon number multiplied by the composition ratio (mole fraction) of the dicarboxylic acid residue is defined as the average carbon number. For example, in the case where the mixture is composed of an adipic acid residue and a phthalic acid residue in the proportion of each of 50% by mole, the average carbon number is 7.0.

Further, in the case of the diol residue, in the same manner as the above, the calculated value of the constituent carbon number multiplied by the composition ratio (mole fraction) of the diol residue is defined as the average carbon number of the diol residue. For example, in the case where the diol is composed of 50 mol % ethylene glycol and 50 mol % 1,2-propane diol, the average carbon number is 2.5.

The number-average molecular weight of the polycondensation ester is preferably from 500 to 2000, more preferably from 600 to 1500, and still more preferably from 700 to 1200. When the number average molecular weight of the polycondensation ester is 600 or greater, volatility becomes lower so that a film failure and process contamination due to sublimation under the high temperature condition during stretching of the cellulose ester film hardly occurs. Further, when the number average molecular weight of the polycondensation ester is 2000 or less, compatibility with the cellulose ester becomes higher so that the bleeding during film production and heat-stretching hardly occurs.

The number-average molecular weight of the polycondensation ester can be measured and evaluated by gel permeation chromatography. In the case of a polyesterpolyol whose terminal is not sealed, the number average molecular weight thereof can also be calculated from an amount of the hydroxyl group per mass (hereinafter, also referred to as "a hydroxyl value"). The hydroxyl value in the present invention is a value obtained by acetylating the polyesterpolyol and then measuring an amount (mg) of potassium hydroxide necessary for neutralizing excessive acetic acid.

In the case where a mixture of an aromatic dicarboxylic acid and an aliphatic dicarboxylic acid is used as the dicarboxylic acid component, an average carbon number of the dicarboxylic acid component is preferably from 5.5 to 10.0, and more preferably from 5.6 to 8.

When the average carbon number of the dicarboxylic acid is 5.5 or greater, a polarizing plate having excellent durability can be obtained. When the average carbon number of the dicarboxylic acid is 10 or less, the compatibility with the cellulose ester is excellent so that generation of the bleed during film production process of the cellulose ester film can be suppressed.

The polycondensation ester obtained from a diol and a dicarboxylic acid containing an aromatic dicarboxylic acid includes an aromatic dicarboxylic acid residue.

In the present specification, the residue means a partial structure of the polycondensation ester and represents a partial structure having a feature of a monomer which forms the polycondensation ester. For example, a dicarboxylic acid residue which is formed from a dicarboxylic acid of HOOC-$L^1$-COOH (formula (4)) is —OC-$L^1$-CO—. $L^1$ is an aliphatic group having 2 to 18 carbon atoms or an aromatic group having 6 to 15 carbon atoms. The aliphatic group may be a straight chain or a branch. The dicarboxylic acid of formula (4) may be used singly, or in combination of two or more kinds. Especially, a mixture of an aromatic dicarboxylic acid and an aliphatic dicarboxylic acid is preferred.

A ratio of the aromatic dicarboxylic acid residue with respect to the polycondensation ester is preferably 40% by mole or greater, and more preferably from 40 to 95% by mole.

When the ratio of the aromatic dicarboxylic acid residue is 40% by mole or greater, a cellulose ester film having a sufficient optical anisotropy is obtained, and a polarizing plate excellent in durability can be obtained. Also, when the ratio of the aromatic dicarboxylic acid residue is 95% by mole or less, compatibility with the cellulose ester becomes excellent, and this makes it possible to hardly cause the bleeding during film production and even during heat stretching of the cellulose ester film.

Examples of the aromatic dicarboxylic acid which is used for the formation of the polycondensation ester-based hydrophobizing agent include phthalic acid, terephthalic acid, isophthalic acid, 1,5-naphthalenedicarboxylic acid, 1,4-naphthalenedicarboxylic acid, 1,8-naphthalenedicarboxylic acid, 2,8-naphthalenedicarboxylic acid and 2,6-naphthalenedicarboxylic acid. Of these aromatic dicarboxylic acids, phthalic acid, terephthalic acid and 2,6-naphthalenedicarboxylic acid are preferred, phthalic acid and terephthalic acid are more preferred, and terephthalic acid is still more preferred.

In the polycondensation ester, the aromatic dicarboxylic acid residue derived from the aromatic dicarboxylic acid used in the mixing is formed.

More specifically, the aromatic dicarboxylic acid residue preferably contains at least one of a phthalic acid residue, a terephthalic acid residue and an isophthalic acid residue, more preferably contains at least one of a phthalic acid residue and a terephthalic acid residue, and still more preferably contains a terephthalic acid residue.

When terephthalic acid is used as the aromatic dicarboxylic acid in the mixing of the polycondensation ester formation, compatibility with the cellulose ester becomes more excellent whereby a cellulose ester film in which bleeding hardly occurs during film production and even during heat stretching of the cellulose ester film can be formed. Further, the aromatic dicarboxylic acid may be used singly or in combination of two or more kinds thereof. In the case of using two kinds of aromatic dicarboxylic acids, it is preferable that phthalic acid and terephthalic acid are used in combination.

The combination use of two kinds of aromatic dicarboxylic acids composed of phthalic acid and terephthalic acid is preferred from the standpoint that the polycondensation ester can be softened at ordinary temperature and handling becomes easy.

The content of the terephthalic acid residue in the dicarboxylic acid residue of the polycondensation ester is preferably from 40 to 100% by mole.

When the content of the terephthalic acid residue is 40% by mole or greater, a cellulose ester film exhibiting a sufficient optical anisotropy is obtained.

The polycondensation ester obtained from a diol and a dicarboxylic acid including an aliphatic dicarboxylic acid contains an aliphatic dicarboxylic acid residue.

Examples of the aliphatic dicarboxylic acid which is used for formation of the polycondensation ester-based hydrophobizing agent include oxalic acid, malonic acid, succinic acid, maleic acid, fumaric acid, glutaric acid, adipic acid, pimelic acid, suberic acid, azelaic acid, sebacic acid, dodecanedicarboxylic acid and 1,4-cyclohexanedicarboxylic acid.

In the polycondensation ester, the aliphatic dicarboxylic acid residue derived from the aliphatic dicarboxylic acid used in the mixing is formed.

An average carbon number of the aliphatic dicarboxylic acid residue is preferably 5.5 to 10.0, more preferably from 5.5 to 8.0, and still more preferably from 5.5 to 7.0. When the average carbon number of the aliphatic dicarboxylic acid residue is 10.0 or less, a loss on heating of the compound can be reduced whereby the occurrence of surface state failure which is considered to be caused by process contamination due to the bleeding during drying process of a cellulose acylate web can be prevented. Moreover, when the average carbon number of the aliphatic dicarboxylic acid residue is 5.5 or greater, it is preferable because compatibility is excellent and deposition of the polycondensation ester hardly occurs.

Specifically, the aliphatic dicarboxylic residue preferably contains a succinic acid residue, and in the case of using two kinds of aliphatic dicarboxylic residues, it is preferred to contain a succinic acid residue and an adipic acid residue.

That is to say, in the mixing of the polycondensation ester formation, the aliphatic dicarboxylic acids may be used singly or in combination of two or more kinds thereof. In the case of using two kinds of aliphatic dicarboxylic acids, it is preferred to use succinic acid and adipic acid. In the case of using one kind of aliphatic dicarboxylic acid in the mixing of the polycondensation ester formation, it is preferred to use succinic acid. In these cases, the average carbon number of the aliphatic dicarboxylic acid residue can be adjusted to a desired value and it is preferred from the standpoint of the compatibility with the cellulose ester.

In the present invention, in the mixing of the polycondensation ester formation, it is preferred to use two or three kinds of dicarboxylic acids. In the case of using two kinds of dicarboxylic acids, it is preferred to use one kind of each of an aliphatic dicarboxylic acid and an aromatic dicarboxylic acid. In the case of using three kinds of dicarboxylic acids, a combination of one kind of an aliphatic dicarboxylic acid and two kinds of aromatic dicarboxylic acids, or a combination of two kinds of aliphatic dicarboxylic acids and one kind of an aromatic dicarboxylic acid may be used. This is because a value of the average carbon number of the dicarboxylic acid residue is easily adjusted, a content of the aromatic dicarboxylic acid residue can be made to fall within a preferred range, and durability of the polarizer can be increased.

The polycondensation ester obtained from a diol and a dicarboxylic acid includes a diol residue.

In the present specification, the diol residue derived from diol HO-$L^2$-OH (formula (5)) is —O-$L^2$-O—. $L^2$ is an aliphatic group having 2 to 8 carbon atoms. The aliphatic group may be a straight chain or a branch. The diol of formula (5) may be used singly, or in combination of two or more kinds. $L^2$ preferably has a straight-chain shape.

The diol which forms a polycondensation ester includes an aromatic diol and an aliphatic diol. The polycondensation ester which can be used as the above-described hydrophobizing agent used in the present invention is preferably formed from at least an aliphatic diol.

The polycondensation ester preferably contains an aliphatic diol residue having an average carbon number from 2.5 to 7.0, and more preferably contains an aliphatic diol residue having an average carbon number from 2.5 or 4.0. When the average carbon number of the aliphatic diol residue is 7.0 or less, compatibility with the cellulose ester is improved, the bleeding hardly occurs, the loss on heating of the compound hardly increases, and occurrence of surface state failure which is considered to be caused by process contamination during drying process of a cellulose acylate web can be prevented. Moreover, when the average carbon number of the aliphatic diol residue is 2.5 or greater, the synthesis is easy.

As the aliphatic diol which can form the polycondensation ester-based hydrophobizing agent used in the present invention, alkyl diols or alicyclic diols can preferably be exemplified. For example, ethylene glycol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylolpentane), 2-n-butyl-2-ethyl-1,3-propanediol (3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, diethylene glycol and cyclohexanedimethanol are preferred. The aliphatic diol is preferably used as a mixture of one or two or more kinds with ethylene glycol.

The aliphatic diol is more preferably at least one of ethylene glycol, 1,2-propanediol and 1,3-propanediol, and particularly preferably at least one of ethylene glycol and 1,2-propanediol. In the case of using two kinds of the aliphatic diols to form the polycondensation ester, it is preferred to use ethylene glycol and 1,2-propanediol. By using 1,2-propanediol or 1,3-propanediol, crystallization of the polycondensation ester can be prevented.

In the polycondensation ester, the diol residue derived from the diol compound used in the mixing is formed.

More specifically, the polycondensation ester preferably contains as the diol residue, at least one of an ethylene glycol residue, a 1,2-propanediol residue and a 1,3-propanediol residue, and more preferably contains an ethylene glycol residue or a 1,2-propanediol residue.

The ethylene glycol residue is preferably contained in the percentage of from 10 to 100% by mole, and more preferably from 20 to 100% by mole with respect to the aliphatic diol residue contained in the polycondensation ester.

The terminal of the polycondensation ester may be the diol or carboxylic acid as it is without being sealed, or sealing of the terminal may be conducted upon further reaction with monocarboxylic acids or monoalcohols.

The monocarboxylic acids which are used for the sealing are preferably acetic acid, propionic acid, butanoic acid, benzoic acid or the like. The monoalcohols which are used for the sealing are preferably methanol, ethanol, propanol, isopropanol, butanol, isobutanol or the like, and most preferably methanol. When the carbon number of the monocarboxylic acids which are used at the terminal of the polycondensation ester is 7 or less, the loss on heating of the compound does not become large, and the surface state failure does not occur.

It is more preferred that the terminal of the polycondensation ester is a diol residue that exists as it is without being sealed or the terminal thereof is sealed with acetic acid, propionic acid or benzoic acid.

It does not matter whether the both terminals of the polycondensation ester are the same or different from one another in terms of the presence of sealing.

In the case where the both terminals of the polycondensation ester are unsealed, the polycondensation ester is preferably a polyesterpolyol.

As one embodiment of the polycondensation ester, a polycondensation ester in which a carbon number of the aliphatic diol residue is from 2.5 to 8.0 and the both terminals of the polycondensation ester are unsealed is exemplified.

In the case where the both terminals of the polycondensation ester are sealed, the both terminals are preferably sealed upon reaction with a monocarboxylic acid. At that time, the both terminals of the polycondensation ester are the monocarboxylic acid residues. In the present specification, a monocarboxylic acid residue which is formed from a monocarboxylic acid of R—COOH is R—CO—. In the case where the both terminals of the polycondensation ester are sealed with a monocarboxylic acid, the monocarboxylic acid residue is preferably an aliphatic monocarboxylic acid residue having 22 or less carbon atoms, and more preferably an aliphatic monocarboxylic acid residue having 3 or less carbon atoms. Moreover, the monocarboxylic acid residue is preferably an aliphatic monocarboxylic acid residue having 2 or more carbon atoms, and particularly preferably an aliphatic monocarboxylic acid residue having 2 carbon atoms.

As one embodiment of the polycondensation ester, a polycondensation ester in which a carbon number of the aliphatic diol residue is more than 2.5 and 7.0 or less and the both terminals of the polycondensation ester are sealed with a monocarboxylic acid residue is exemplified.

When the carbon number of the monocarboxylic acid residue sealing the both terminals of the polycondensation ester is 3 or less, the volatility is decreased, the loss on heating of the polycondensation ester does not become large, and it is possible to reduce the generation of process contamination and the occurrence of surface state failure.

More specifically, the monocarboxylic acid which is used for the sealing is preferably an aliphatic monocarboxylic acid, more preferably an aliphatic monocarboxylic acid having from 2 to 22 carbon atoms, still more preferably an aliphatic monocarboxylic acid having from 2 to 3 carbon atoms, and particularly preferably an aliphatic monocarboxylic acid having 2 carbon atoms.

For example, acetic acid, propionic acid, butanoic acid, benzoic acid and their derivatives are preferable; acetic acid and propionic acid are more preferable; acetic acid is most preferable.

A mixture of two or more different kinds of monocarboxylic acids may be used for terminal sealing.

It is preferable that both terminals of the polycondensation ester are sealed with acetic acid or propionic acid, and it is most preferable that the both terminals of the polycondensation ester are modified to be an acetyl ester residue (sometimes referred to as "acetyl residue") upon being sealed with acetic acid.

In the case where the both terminals of the polycondensation ester are sealed, the state at an ordinary temperature is hardly changed to a solid form and therefore good handling ability can be provided. Further, a cellulose ester film having excellent humidity stability and polarizer durability can be obtained.

Specific examples J-1 to J-41 of the polycondensation ester are shown in Table A below, but the present invention is not limited thereto.

TABLE A

| | Dicarboxylic acid | | | Diol | | | |
|---|---|---|---|---|---|---|---|
| | Aromatic dicarboxylic acid | Aliphatic dicarboxylic acid | Dicarboxylic acid ratio (molar ratio) | Diol 1 | Diol 2 | Diol ratio (molar ratio) | Terminal |
| J-1 | TPA | SA | 45/55 | Ethanediol | Propanediol | 45/55 | Acetyl ester group |
| J-2 | TPA | SA | 50/50 | Ethanediol | Propanediol | 45/55 | Acetyl ester group |
| J-3 | TPA | SA | 55/45 | Ethanediol | Propanediol | 45/55 | Acetyl ester group |
| J-4 | TPA | SA | 65/35 | Ethanediol | Propanediol | 45/55 | Acetyl ester group |
| J-5 | TPA | SA | 55/45 | Ethanediol | Propanediol | 25/75 | Acetyl ester group |
| J-6 | TPA | SA | 55/45 | Ethanediol | Propanediol | 10/90 | Acetyl ester group |
| J-7 | 2,6-NPA | SA | 50/50 | Ethanediol | Propanediol | 45/55 | Acetyl ester group |
| J-8 | 2,6-NPA | SA | 50/50 | Ethanediol | Propanediol | 45/55 | Acetyl ester group |
| J-9 | TPA/PA | SA | 45/5/50 | Ethanediol | Propanediol | 45/55 | Acetyl ester group |
| J-10 | TPA/PA | SA | 40/10/50 | Ethanediol | Propanediol | 45/55 | Acetyl ester group |
| J-11 | TPA | SA/AA | 50/30/20 | Ethanediol | Propanediol | 45/55 | Acetyl ester group |
| J-12 | TPA | SA/AA | 50/20/30 | Ethanediol | Propanediol | 45/55 | Acetyl ester group |
| J-13 | TPA | SA | 50/50 | Ethanediol | Propanediol | 25/75 | Acetyl ester group |
| J-14 | TPA | SA | 55/45 | Ethanediol | Propanediol | 45/55 | Acetyl ester group |
| J-15 | TPA | SA | 55/45 | Ethanediol | Cyclohexane dimethanol | 45/55 | Acetyl ester group |
| J-16 | TPA | SA | 45/55 | Ethanediol | Propanediol | 45/55 | Hydroxyl group |
| J-17 | TPA | SA | 50/50 | Ethanediol | Propanediol | 45/55 | Hydroxyl group |
| J-18 | TPA | SA | 55/45 | Ethanediol | Propanediol | 45/55 | Hydroxyl group |
| J-19 | TPA | SA | 65/35 | Ethanediol | Propanediol | 45/55 | Hydroxyl group |
| J-20 | TPA | SA | 55/45 | Ethanediol | Propanediol | 25/75 | Hydroxyl group |
| J-21 | TPA | SA | 55/45 | Ethanediol | Propanediol | 10/90 | Hydroxyl group |
| J-22 | 2,6-NPA | SA | 50/50 | Ethanediol | Propanediol | 25/75 | Hydroxyl group |
| J-23 | 2,6-NPA | SA | 50/50 | Ethanediol | Propanediol | 25/75 | Hydroxyl group |
| J-24 | 2,6-NPA | SA/AA | 45/5/50 | Ethanediol | Propanediol | 25/75 | Hydroxyl group |
| J-25 | 2,6-NPA | SA/AA | 40/10/50 | Ethanediol | Propanediol | 25/75 | Hydroxyl group |
| J-26 | TPA | SA/AA | 50/30/20 | Ethanediol | Propanediol | 25/75 | Hydroxyl group |
| J-27 | TPA | SA/AA | 50/20/30 | Ethanediol | Propanediol | 25/75 | Hydroxyl group |
| J-28 | TPA | SA | 50/50 | Ethanediol | Propanediol | 25/75 | Hydroxyl group |
| J-29 | TPA | SA | 55/45 | Ethanediol | Propanediol | 25/75 | Hydroxyl group |
| J-30 | TPA | SA | 55/45 | Ethanediol | Propanediol | 25/75 | Hydroxyl group |
| J-31 | TPA | SA | 55/45 | Ethanediol | Propanediol | 45/55 | Propionyl ester group |
| J-32 | TPA | SA | 100/0 | Ethanediol | Propanediol | 50/50 | Hydroxyl group |
| J-33 | TPA | SA | 100/0 | Ethanediol | Propanediol | 40/60 | Acetyl ester group |
| J-34 | TPA | SA | 50/50 | Ethanediol | Propanediol | 45/55 | Benzoyl ester group |
| J-35 | TPA | SA | 55/45 | Ethanediol | Propanediol | 50/50 | Hydroxyl group |
| J-36 | TPA | SA | 55/45 | Ethanediol | Propanediol | 50/50 | Acetyl ester group |
| J-37 | TPA | SA | 80/20 | Ethanediol | Propanediol | 50/50 | Hydroxyl group |
| J-38 | TPA | SA | 80/20 | Ethanediol | Propanediol | 50/50 | Acetyl ester group |
| J-39 | PA | AA | 10/90 | Ethanediol | None | 100/0 | Acetyl ester group |
| J-40 | PA | AA | 25/75 | Ethanediol | None | 100/0 | Acetyl ester group |
| J-41 | PA | AA | 50/50 | Ethanediol | None | 100/0 | Acetyl ester group |

Here, the abbreviated expressions in the above Table A represent the following compound, respectively. PA: phthalic acid, TPA: terephthalic acid, AA: adipic acid, SA: succinic acid, 2,6-NPA: 2,6-naphthalene dicarboxylic acid The polycondensation ester can be produced with ease according to any conventional method, for example, a polyesterification of diols and dicarboxylic acids or a thermal fusing condensation method by interesterification, or an interfacial condensation method of acid chlorides of these acids and glycols. In addition, polycondensation esters are described in detail in Koichi Murai, "Plasticizers and their Theory and Applications" (by Saiwai Shobo, 1$^{st}$ Ed., issued on Mar. 1, 1973). Further, usable herein are materials described in JP-A-5-155809, JP-A-5-155810, JP-A-5-197073, JP-A-2006-259494, JP-A-7-330670, JP-A-2006-342227 and JP-A-2007-003679.

(Carbohydrate Derivative-Based Plasticizer)

As the plasticizer, a monosaccharide or a carbohydrate derivative containing from 2 to 10 monosaccharide units is preferred (hereinafter referred to as carbohydrate derivative-based plasticizer).

The monosaccharide or polysaccharide by which the carbohydrate derivative-based plasticizer is preferably composed is characterized in that any of substitutable groups which are contained in the molecule thereof (for instance, a hydroxyl group, a carboxyl group, an amino group, and a mercapto group) are substituted. Examples of the structure formed by substitution include an alkyl group, an aryl group, and an acyl group. Further, an ether structure formed by substitution, an ester structure formed by a hydroxyl group substituted with an acyl group, and an amide structure or an imide structure formed by substitution with an amino group are exemplified.

Examples of the carbohydrates including the above-described monosaccharide or carbohydrate derivative containing from 2 to 10 monosaccharide units include erythrose, threose, ribose, arabinose, xylose, lyxose, arose, altrose, glucose, fructose, mannose, gulose, idose, galactose, talose, trehalose, isotrehalose, neotrehalose, trehalosamine, kojibiose, nigerose, maltose, maltitol, isomaltose, sophorose, laminaribiose, cellobiose, gentiobiose, lactose, lactosamine, lactitol, lactulose, melibiose, primeverose, rutinose, scillabiose, sucrose, sucralose, turanose, vicianose, cellotriose, chacotriose, gentianose, isomaltotriose, isopanose, maltotriose, manninotriose, melezitose, panose, planteose, raffinose, solatriose, umbelliferose, lycotetraose, maltotetraose, stachyose, baltopentaose, belbalcose, maltohexaose, α-cyclodextrin, β-cyclodextrin, γ-cyclodextrin, δ-cyclodextrin, xylitol, and sorbitol.

Among these, ribose, arabinose, xylose, lyxose, glucose, fructose, mannose, galactose, trehalose, maltose, cellobiose, lactose, sucrose, sucralose, α-cyclodextrin, β-cyclodextrin, γ-cyclodextrin, δ-cyclodextrin, xylitol, and sorbitol are preferred. Further, arabinose, xylose, glucose, fructose, mannose, galactose, maltose, cellobiose, sucrose, β-cyclodextrin, and γ-cyclodextrin are more preferred, and xylose, glucose, fructose, mannose, galactose, maltose, cellobiose, sucrose, xylitol, and sorbitol are particularly preferred.

Examples of the substituents for the carbohydrate derivative-based plasticizer include an alkyl group (preferably an alkyl group having 1 to 22 carbon atoms, more preferably 1 to 12 carbon atoms, and particularly preferably 1 to 8 carbon atoms, for example, a methyl group, an ethyl group, a propyl group, a hydroxyethyl group, a hydroxypropyl group, a 2-cyanoethyl group and a benzyl group), an aryl group (preferably an aryl group having 6 to 24 carbon atoms, more preferably 6 to 18 carbon atoms, and particularly preferably 6 to 12 carbon atoms, for example, a phenyl group and a naphthyl group), and an acyl group (preferably an acyl group having 1 to 22 carbon atoms, more preferably 2 to 12 carbon atoms, and particularly preferably 2 to 8 carbon atoms, for example, acetyl, propionyl, butyryl, pentanoyl, hexanoyl, octanoyl, benzoyl, toluoyl, phthalyl and naphthoyl). Further, preferable examples of the structure formed by substitution with an amino group include an amide structure (preferably an amide having 1 to 22 carbon atoms, more preferably 2 to 12 carbon atoms, and particularly preferably 2 to 8 carbon atoms, for example, formamide, acetamide and the like), and an imido structure (preferably an imide having 4 to 22 carbon atoms, more preferably 4 to 12 carbon atoms, and particularly preferably 4 to 8 carbon atoms, such as succinimide and phthalimide).

Among these, an alkyl group, an aryl group or an acyl group is more preferable, an acyl group is particularly preferably.

Preferable examples of the carbohydrate derivative-based plasticizer include the followings. However, the carbohydrate derivative-based plasticizer that can be used in the present invention is not limited thereto.

Xylose tetraacetate, glucose pentaacetate, fructose pentaacetate, mannose pentaacetate, galactose pentaacetate, maltose octaacetate, cellobiose octaacetate, sucrose octaacetate, xylitol pentaacetate, sorbitol hexaacetate, xylose tetrapropionate, glucose pentapropionate, fructose pentapropionate, mannose pentapropionate, galactose pentapropionate, maltose octapropionate, cellobiose octapropionate, sucrose octapropionate, xylitol pentapropionate, sorbitol hexapropionate, xylose tetrabutyrate, glucose pentabutyrate, fructose pentabutyrate, mannose pentabutyrate, galactose pentabutyrate, maltose octabutyrate, cellobiose octabutyrate, sucrose octabutyrate, xylitol pentabutyrate, sorbitol hexabutyrate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate. Among these, xylose tetraacetate, glucose pentaacetate, fructose pentaacetate, mannose pentaacetate, galactose pentaacetate, maltose octaacetate, cellobiose octaacetate, sucrose octaacetate, xylitol pentaacetate, sorbitol hexaacetate, xylose tetrapropionate, glucose pentapropionate, fructose pentapropionate, mannose pentapropionate, galactose pentapropionate, maltose octapropionate, cellobiose octapropionate, sucrose octapropionate, xylitol pentapropionate, sorbitol hexapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate are more preferred. Especially, maltose octaacetate, cellobiose octaacetate, sucrose octaacetate, xylose tetrapropionate, glucose pentapropionate, fructose pentapropionate, mannose pentapropionate, galactose pentapropionate, maltose octapropionate, cellobiose octapropionate, sucrose octapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate are still more preferred.

The carbohydrate derivative-based hydrophobizing agent preferably has a pyranose structure or a furanose structure.

Of the carbohydrate derivatives used in the present invention, the following compounds are particularly preferred. However, the carbohydrate derivatives which can be used in the present invention are not limited to these compounds. In the following structure, each of Rs independently represents an arbitrary substituent. A plurality of Rs may be the same or different from one another.

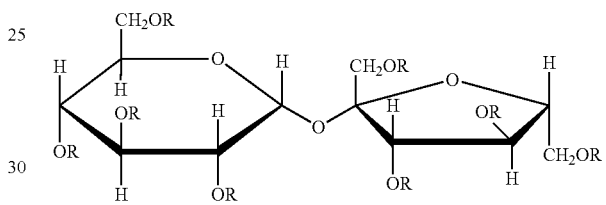

TABLE B

| | Substituent 1 | | Substituent 2 | | |
|---|---|---|---|---|---|
| Compound | Kind | Substitution degree | Kind | Substitution degree | Molecular weight |
| K-101 | Acetyl | 7 | Benzyl | 1 | 727 |
| K-102 | Acetyl | 6 | Benzyl | 2 | 775 |
| K-103 | Acetyl | 7 | Benzoyl | 1 | 741 |
| K-104 | Acetyl | 6 | Benzoyl | 2 | 802 |
| K-105 | Benzyl | 2 | None | 0 | 523 |
| K-106 | Benzyl | 3 | None | 0 | 613 |
| K-107 | Benzyl | 4 | None | 0 | 702 |
| K-108 | Acetyl | 7 | Phenyl acetyl | 1 | 771 |
| K-109 | Acetyl | 6 | Phenyl acetyl | 2 | 847 |
| K-110 | Benzoyl | 1 | None | 0 | 446 |
| K-111 | Benzoyl | 2 | None | 0 | 551 |
| K-112 | Benzoyl | 3 | None | 0 | 655 |
| K-113 | Benzoyl | 4 | None | 0 | 759 |
| K-114 | Benzoyl | 5 | None | 0 | 863 |
| K-115 | Benzoyl | 6 | None | 0 | 967 |
| K-116 | Benzoyl | 7 | None | 0 | 1071 |
| K-117 | Benzoyl | 8 | None | 0 | 1175 |

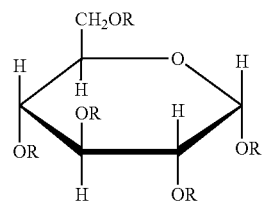

TABLE C

| Compound | Substituent 1 Kind | Substituent 1 Substitution degree | Substituent 2 Kind | Substituent 2 Substitution degree | Molecular weight |
|---|---|---|---|---|---|
| K-201 | Acetyl | 4 | Benzoyl | 1 | 468 |
| K-202 | Acetyl | 3 | Benzoyl | 2 | 514 |
| K-203 | Acetyl | 2 | Benzoyl | 3 | 577 |
| K-204 | Acetyl | 4 | Benzyl | 1 | 454 |
| K-205 | Acetyl | 3 | Benzyl | 2 | 489 |
| K-206 | Acetyl | 2 | Benzyl | 3 | 535 |
| K-207 | Acetyl | 4 | Phenyl acetyl | 1 | 466 |
| K-208 | Acetyl | 3 | Phenyl acetyl | 2 | 543 |
| K-209 | Acetyl | 2 | Phenyl acetyl | 3 | 619 |
| K-210 | Phenyl acetyl | 1 | None | 0 | 298 |
| K-211 | Phenyl acetyl | 2 | None | 0 | 416 |
| K-212 | Phenyl acetyl | 3 | None | 0 | 535 |
| K-213 | Phenyl acetyl | 4 | None | 0 | 654 |
| K-214 | Acetyl | 1 | Benzoyl | 4 | 639 |
| K-215 | Acetyl | 0 | Benzoyl | 5 | 701 |

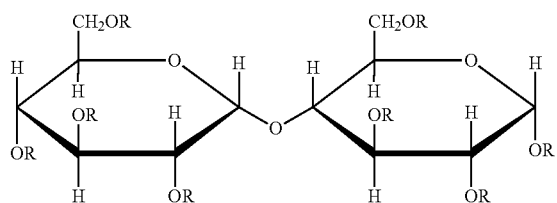

TABLE D

| Compound | Substituent 1 Kind | Substituent 1 Substitution degree | Substituent 2 Kind | Substituent 2 Substitution degree | Molecular weight |
|---|---|---|---|---|---|
| K-301 | Acetyl | 6 | Benzoyl | 2 | 803 |
| K-302 | Acetyl | 6 | Benzyl | 2 | 775 |
| K-303 | Acetyl | 6 | Phenyl acetyl | 2 | 831 |
| K-304 | Benzoyl | 2 | None | 0 | 551 |
| K-305 | Benzyl | 2 | None | 0 | 522 |
| K-306 | Phenyl acetyl | 2 | None | 0 | 579 |

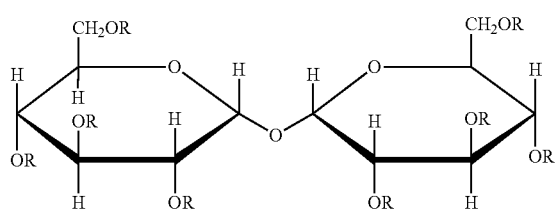

TABLE E

| Compound | Substituent 1 Kind | Substituent 1 Substitution degree | Substituent 2 Kind | Substituent 2 Substitution degree | Molecular weight |
|---|---|---|---|---|---|
| K-401 | Acetyl | 6 | Benzoyl | 2 | 803 |
| K-402 | Acetyl | 6 | Benzyl | 2 | 775 |
| K-403 | Acetyl | 6 | Phenyl acetyl | 2 | 831 |
| K-404 | Benzoyl | 2 | None | 0 | 551 |
| K-405 | Benzyl | 2 | None | 0 | 523 |
| K-406 | Phenyl ester | 2 | None | 0 | 579 |

(Obtaining Method)

The carbohydrate derivative is available as a marketed product from Tokyo Chemical Industry Co., Ltd., Sigma-Aldrich Corporation and the like. Alternatively, the carbohydrate derivative can be readily synthesized by subjecting a commercially available carbohydrate to a known ester derivatization method (for example, a method described in JP-A-8-245678).

The additive amount of the hydrophobizing agent is preferably from 1 to 20 parts by mass with respect to 100 parts by mass of the cellulose acylate. When the additive amount is 1 part by mass or greater, an effect of improvement in polarizer durability can be easily achieved. While on the other hand, when the additive amount is 20 parts by mass or less, bleeding is suppressed. The additive amount is more preferably from 2 to 15 parts by mass, and particularly preferably from 5 to 15 parts by mass.

The timing of addition of the hydrophobizing agent to the cellulose acylate film is not particularly limited, as long as it is added at the time of film production. For example, it may be added at the time when the cellulose acylate is synthesized, or alternatively it may be mixed with the cellulose acylate at the time of preparing a dope.

(Antioxidant)

In the present invention, it is possible to add to a cellulose acylate solution a known antioxidant, for example, a phenol-based or hydroquinone-based antioxidant, such as 2,6-di-tert-butyl-4-methylphenol, 4,4'-thiobis-(6-tert-butyl-3-methylphenol), 1,1'-bis(4-hydroxyphenyl)cyclohexane, 2,2'-methylenebis (4-ethyl-6-tert-butylphenol), 2,5-di-tert-butylhydroquinone and pentaerythrityl-tetrakis [3-(3,5-di-tert-butyl-4-hydroxyphenyl) propionate]. Further, it is preferable to add a phosphorus-based antioxidant, such as tris (4-methoxy-3,5-diphenyl)phosphite, tris (nonylphenyl)phosphite, tris (2,4-di-tert-butylphenyl)phosphite, bis(2,6-di-tert-butyl-4-methylphenyl)pentaerythritol diphosphite, and bis(2,4-di-tert-butylphenyl)pentaerythritol diphosphite. As for the additive amount of the antioxidant, the antioxidant is preferably added in the proportion of from 0.05 to 5.0 parts by mass with respect to 100 parts by mass of the cellulosic resin.

(Ultraviolet Absorbent)

In the present invention, an ultraviolet absorbent may be added to the cellulose acylate solution from the viewpoint of preventing deterioration of a polarizing plate, a liquid crystal or the like. As the ultraviolet absorbent, it is preferable to use those which have excellent absorption capacity of ultraviolet at the wavelength of 370 nm or less and further which exhibit a low absorption of visible light having the wavelength of 400 nm or longer from the viewpoint of good properties for the liquid crystal display. Examples of the ultraviolet absorbent which is preferably used in the present invention include a hindered phenol-based compound, a hydroxybenzophenone-based compound, a benzotriazole-based compound, a salicylic acid ester-based compound, a benzophenone-based compound, a cyano acrylate-based compound and a nickel complex-based compound. Examples of the hindered phenol-based compound include 2,6-di-tert-butyl-p-cresol, pentaerythrityl-tetrakis [3-(3,5-di-tert-butyl-4-hydroxyphenyl) propionate], N,N'-hexamethylenebis (3,5-di-tert-butyl-4-hydroxy-hydrocinnamide), 1,3,5-trimethyl-2,4,6-tris (3,5-di-tert-butyl-4-hydroxybenzyl)benzene, and tris (3,5-di-tert-butyl-4-hydroxybenzyl) isocyanurate. Examples of the benzotriazole-based compound include 2-(2'-hydroxy-5'-methylphenyl)benzotriazole, 2,2-methylenebis[4-(1,1,3,3-tetramethylbutyl)-6-(2H-benzotriazole-2-yl)phenol], (2,4-bis-(n-octylthio)-6-(4-hydroxy-3,5-di-tert-butylanilino)-1,3,5-triazine, triethyleneglycol-bis[3-β-tert-butyl-5-methyl-4-hydroxyphenyl) propionate], N,N'-hexamethylenebis (3,5-di-tert-butyl-4-hydroxy-hydrocinnamide), 1,3,5-trimethyl-2,4,6-tris (3,5-di-tert-butyl-4-hydroxybenzyl)benzene, 2-(2'-hydroxy-3',5'-di-tert-butylphenyl)-5-chlorobenzotriazole, 2-(2'-hydroxy-3',5'-di-tert-amylphenyl)-5-chlorobenzotriazole, 2,6-di-tert-butyl-p-cresol, and pentaerythrityl-tetrakis [3-(3,5-di-tert-butyl-4-hydroxyphenyl) propionate]. The additive amount of the ultraviolet absorbent is preferably from 1 ppm to 1.0%, and more preferably from 10 to 1000 ppm, in terms of mass proportion in the entire optical film.

(Matting Agent)

A matting agent may be added to the cellulose acylate film of the present invention from the viewpoint of film lubricity (slipping property) and stable production. The matting agent may be either a matting agent composed of an inorganic compound or a matting agent composed of an organic compound.

Preferred examples of the matting agent of an inorganic compound include silicon-containing inorganic compounds (e.g., silicon dioxide, calcined calcium silicate, hydrated calcium silicate, aluminium silicate, magnesium silicate, etc.), titanium oxide, zinc oxide, aluminium oxide, barium oxide, zirconium oxide, strontium oxide, antimony oxide, tin oxide, antimony-doped tin oxide, calcium carbonate, talc, clay, calcined kaolin, calcium phosphate, etc. More preferred are silicon-containing inorganic compounds and zirconium oxide. Particularly preferred is silicon dioxide since it can reduce the haze of cellulose acylate films. As fine particles of silicon dioxide, for example, commercially available products under such trade names as Aerosil R972, R974, R812, 200, 300, R202, OX50, and TT600 (manufactured by Nippon Aerosil Co., Ltd.) may be used. As fine particles of zirconium oxide, commercially available products, for example, under such trade names as Aerosil R976 and R811 (manufactured by Nippon Aerosil Co., Ltd.) may be used.

Preferred examples of the matting agent of an organic compound include polymers such as silicone resins, fluororesins, acrylic resins, etc. Above all, more preferred are silicone resins. Of silicone resins, even more preferred are those having a three-dimensional network structure. For example, usable are commercial products of Tospearl 103, Tospearl 105, Tospearl 108, Tospearl 120, Tospearl 145, Tospearl 3120 and Tospearl 240 (all trade names by Toshiba Silicone), etc.

When the matting agent is added to a cellulose acylate solution, any method is employable with no problem, as long as it can produce a desired cellulose acylate solution. For example, the additive may be added in the stage where a cellulose acylate is mixed with a solvent; or the additive may be added to a mixture solution prepared from a cellulose acylate and a solvent. Further, the additive may be added to and mixed with a dope just before the dope is cast, and this is a so-called immediate addition method, in which the ingredients may be on-line mixed by screw kneading. Concretely, preferred is a static mixer such as an in-line mixer. As the in-line mixer, for example, preferred is a static mixer SWJ (Toray's static tubular mixer, Hi-Mixer (trade name), by Toray Engineering). Regarding the mode of in-line addition, JP-A-2003-53752 describes an invention of a method for producing a cellulose acylate film wherein, for the purpose of preventing concentration unevenness and particle aggregation, the distance L between the addition nozzle tip through which an additive liquid having a composition differing from that of the main material dope and the start end of an in-line mixer is controlled to be at most 5 times the inner diameter d of the main material feeding line, thereby preventing concentration unevenness and aggregation of matting particles, etc. The patent reference discloses a more preferred embodiment, in which the distance (L) between the nozzle tip opening through which an additive liquid having a composition differing from that of the main material dope and the start end of the in-line mixer is controlled to be at most 10 times the inner diameter (d) of the feeding nozzle tip opening, and the in-line mixer is a static non-stirring tubular mixer or a dynamic stirring tubular mixer. More concretely, the patent reference discloses that the flow ratio of the cellulose acylate film main material dope/in-line additive liquid is from 10/1 to 500/1, more preferably from 50/1 to 200/1. JP-A-2003-14933 discloses an invention of providing a phase difference film which is free from a trouble of additive bleed out and a trouble of interlayer peeling and which has good lubricity and excellent transparency; and regarding the method of adding additives to the film, the patent reference describes that the additive may be added to a dissolving tank, or the additive or a solution or dispersion of the additive may be added to the dope being fed in the process from the dissolving tank to a co-casting die, further describes that in the latter case, mixing means such as a static mixer is preferably provided for the purpose of enhancing the mixing efficiency therein.

In the above-described cellulose acylate film, the matting agent does not increase the haze of the film so far as a large amount of the agent is not added to the film. In fact, when the film containing a suitable amount of a matting agent is used in LCD, the film hardly brings disadvantages of contrast reduction and bright spot formation. Not too small amount, the matting agent in the film can realize the creaking resistance and the scratch resistance of the film. From these viewpoints, the matting agent content is particularly preferably from 0.05 to 1.0% by mass.

<Configuration and Physical Properties of Cellulose Acylate Film>

(Layer Structure of Film)

The cellulose acylate film may be a single layer or may be a laminate of two or more layers.

In the case where the cellulose acylate film is a laminate of two or more layers, the film preferably has a two-layered structure or a three-layered structure, more preferably a three-layered structure. The film having a three-layered structure preferably has a layer that is in contact with the metal support when producing the film by solution casting (hereinafter this layer may be also referred to as a support-side surface, or a skin B layer), a layer facing the air interface opposite to the metal support (hereinafter this layer may be also referred to as an air-side surface or a skin A layer), and a core layer (herein after this layer may be also referred to as a base layer) sandwiched between these. Specifically, the film of the present invention preferably has a three-layered structure of skin B layer/core layer/skin A layer.

It is noted that, the skin A layer and the skin B layer would be sometimes collectively called as skin layers (or surface layers).

In the cellulose acylate film, the degree of acyl substitution in the cellulose acylate in the individual layers may be the same; or cellulose acylates having different degree of acyl substitution may be mixed to form one layer. Preferably, the degree of acyl substitution in the cellulose acylate in the individual layers is the same from the viewpoint of regulating the optical properties. When the cellulose acylate film has a three-layer structure, preferably, the cellulose acylates constituting the surface layers on both sides have the same degree of acyl substitution from the viewpoint of reducing the production cost.

(Elastic Modulus)

The film of the present invention exhibits practically-sufficient elastic modulus. The range of the elastic modulus, although it is not particularly limited, is preferably from 1.0 GPa to 5.0 GPa, and more preferably from 2.0 GPa to 4.5 GPa, from the viewpoint of production suitability and handling properties. The polymer having a specific aromatic ring represented by the above-described formula (1), due to addition to cellulose acylate, exerts an effect of improvement in its elastic modulus. This is also an advantage of the present invention.

(Photoelastic Coefficient)

The absolute value of photoelastic coefficient of the film of the present invention is preferably $8.0 \times 10^{-12}$ $m^2/N$ or less, more preferably $6 \times 10^{-12}$ $m^2/N$ or less, and still more preferably $5 \times 10^{-12}$ $m^2/N$ or less. Reduced photoelastic coefficient of the resin film makes it possible to suppress generation of unevenness under conditions of high temperature and high humidity when the resin film is incorporated as a polarizing plate-protecting film in a liquid crystal display device. The photoelastic coefficient is measured and calculated in accordance with the following method, unless otherwise indicated in particular. The lower limit of photoelastic coefficient is not particularly limited, but practically $0.1 \times 10^{-12}$ $m^2/N$ or more.

A film is cut into a specimen of 3.5 cm×12 cm and Re is measured under each load of non-load, 250 g, 500 g, 1000 g and 1500 g using an ellipsometer (M 150 [trade name], manufactured by JASCO Corporation), and by calculation based on the slope of a straight line of Re change to stress, the photoelastic coefficient is measured.

(Water Content Ratio)

The water content ratio of the resin film can be evaluated by measurement of equilibrium water content ratio at a given temperature and humidity. The equilibrium water content ratio is obtained as follows. That is, a sample is left for 24 hours at the above-described temperature and humidity, and then the water content of the sample which has achieved equilibrium is measured in accordance with Karl Fischer's method, and then the water content (g) is divided by the mass (g) of the sample to calculate the equilibrium water content ratio.

The water content ratio of the resin film of the present invention in terms of percentage at 25° C. and 80% relative humidity (RH) is preferably 5% by mass or less, more preferably 4% by mass or less, and still more preferably less than 3% by mass. Reduced water content ratio of the resin film makes it possible to suppress generation of unevenness under conditions of high temperature and high humidity when the resin film is incorporated as a polarizing plate-protecting film in a liquid crystal display device. The lower limit of water content ratio is not particularly limited, but practically 0.1% by mass or more.

(Water-Vapor Transmission Ratio)

The water-vapor transmission ratio of the resin film can be evaluated by measuring the weight of water-vapor which has passed through a sample of 1 $m^2$ area during 24 hours in the atmosphere of temperature: 60° C. and relative humidity: 95% RH in accordance with the water-vapor transmission ratio test (cup method) prescribed in JIS Z0208.

The water-vapor transmission ratio of the resin film of the present invention is preferably from 500 to 2000 $g/m^2 \cdot day$, more preferably from 900 to 1300 $g/m^2 \cdot day$, and particularly preferably from 1000 to 1200 $g/m^2 \cdot day$.

(Haze)

The above-described cellulose acylate film preferably has a haze of 1% or less, more preferably 0.7% or less, particularly preferably 0.5% or less. Under the condition of haze controlled not more than the above upper limit, the film exhibits higher transparency and better usability as an optical film. The haze is measured and calculated in accordance with the method adopted in Example section below, unless otherwise indicated in particular. The lower limit of haze is not particularly limited, but practically 0.001% or more.

(Film Thickness)

Preferably, the mean thickness of the above-described cellulose acylate film is from 30 to 100 μm, more preferably from 30 to 80 μm, even more preferably from 30 to 70 μm. With a mean thickness of at least 30 μm, the handling of the film in producing the film as a web can be improved. With a mean thickness of at most 70 μm, the film may readily follow the ambient humidity change and may keep its optical properties.

In the case where the cellulose acylate film has a three-layer or more multilayer laminate structure, the core layer preferably has a thickness of from 30 to 70 μm, more preferably from 30 to 60 μm. In the case where the film of the present invention has a three-layer or more multilayer laminate structure, the surface layers on both sides (skin A layer and skin B layer) of the film each preferably have a thickness of from 0.5 to 20 m, more preferably from 0.5 to 10 μm, even more preferably from 0.5 to 3 μm.

(Film Width)

The film width of the cellulose acylate film is preferably from 700 to 3,000 mm, more preferably from 1,000 to 2,800 mm, particularly preferably from 1,300 to 2,500 mm.

<Method for Producing Cellulose Acylate Film>

Hereinafter, the producing method of the cellulose acylate film in the present invention will be explained in detail.

The cellulose acylate film is preferably produced in accordance with a solvent-casting method. Examples of production of the cellulose acylate film utilizing a solvent-casting method are given in U.S. Pat. No. 2,336,310, U.S. Pat. No. 2,367,603, U.S. Pat. No. 2,492,078, U.S. Pat. No. 2,492,977, U.S. Pat. No. 2,492,978, U.S. Pat. No. 2,607,704, U.S. Pat. No. 2,739,069, U.S. Pat. No. 2,739,070, British Patent No. 640731, British Patent No. 736892, JP-B-45-4554 ("JP-B" means examined Japanese patent application), JP-B-49-5614, JP-A-60-176834, JP-A-60-203430, JP-A-62-115035, and their descriptions are referred to herein. The cellulose acylate film may be subjected to a drawing treatment. Regarding the method and condition for drawing treatment, for example, referred to are JP-A-62-115035, JP-A-4-152125, JP-A-4-284211, JP-A-4-298310, and JP-A-11-48271.

(Casting Method)

A solution casting method is employable here, including, for example, a method of uniformly extruding a prepared dope through a pressure die onto a metal support, a doctor blade method where the dope once cast onto a metal support is treated with a blade for controlling its thickness, a reverse roll coater method where the film formation is controlled by the rolls rotating in opposite directions, etc. Preferred is the method using a pressure die. The pressure die includes a coat hunger die, a T-die, etc., any of which is preferably usable here. Apart from the methods mentioned herein, other various methods are also employable that have heretofore been known for film formation by solution casting of cellulose triacetate solution. The condition in solution casting may be suitably selected in consideration of the difference in the boiling point or the like of the solvents to be used; and the same effects as in the patent references can also be attained.

<Co-Casting>

In forming the above-described cellulose acylate film, it is preferable to employ a laminate casting method such as a co-casting method, a successive casting method and a coating method. Above all, it is especially preferable to employ a simultaneous co-casting method from the viewpoint of producing the film stably and reducing the production cost.

Figure 2:
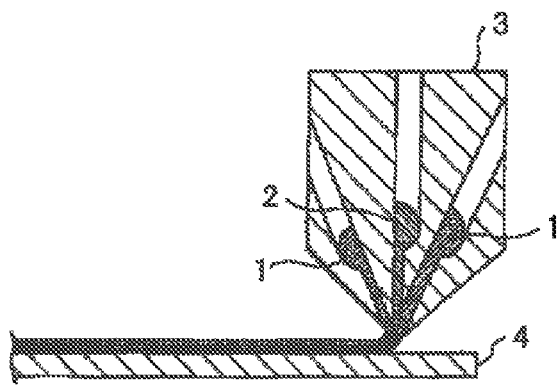
FIG. 2 is a schematic view showing an example of casting to obtain a cellulose acylate film having three-layer structure, by simultaneous co-casting method using a co-casting die.

In the case of achieving the production by the co-casting method or the successive casting method, first of all, a cellulose acylate solution (dope) for each layer is prepared. The co-casting method (multilayer simultaneous casting) is a casting method in which casting dopes for respective layers (which may be three or more layers) are each extruded on a casting support (for example, a band or a drum) from a casting Gieser, which simultaneously extrudes the dopes from separate slits or the like, thereby casting the respective layers at the same time; followed by stripping off from the support at an appropriate timing and drying to form a film. FIG. 2 is a cross-sectional view showing a state that three layers of dopes 1 for skin layer and a dope 2 for core layer are simultaneously extruded on a casting support 4 by using a co-casting Gieser 3.

The successive casting method is a casting method in which a casting dope for first layer is first extruded and cast on a casting support from a casting Gieser, and after drying or without drying, a casting dope for second layer is then extruded and cast thereon; if desired, a dope is further cast and stacked in this manner for third or more layers; and the layers are stripped off from the support at an appropriate timing, followed by drying to form a film. In general, the coating method is a method in which a film for core layer is formed into a film by a solution film formation method; a coating solution for a skin layer is prepared; and the coating solution is coated and dried on the film on every surface one by one or both surfaces at the same time by using an appropriate coating machine to form a film of a laminate structure.

As a metal support that runs in an endless manner, and is used for producing the above-described cellulose acylate film, a drum of which a surface is mirror-finished by chromium plating or a stainless steel belt (the belt may also be called a band) which is mirror-finished by surface polishing is used. A pressure die to be used may be set up in the number of one or two or more in an upper part of the metal support. The number of pressure dies is preferably one or two. In the case where two or more pressure dies are set up, the amount of the dope to be cast may be divided in various proportions for the respective dies. Alternatively, the dope may be sent to the dies in the respective proportions from plural precision metering gear pumps. The temperature of the dope (resin solution) which is used for casting is preferably from −10° C. to 55° C., and more preferably from 25° C. to 50° C. In that case, the solution temperature may be identical in all of the steps, or the solution temperature may be different in each place of the steps. In the case where the solution temperature is different, it would be better that the solution temperature just before casting is adjusted to a desired temperature.

Moreover, although there is no restriction in particular about the material of the metal support, it is preferable that it is made of SUS (for example, SUS316).

(Peeling)

The above-described method of producing a cellulose acylate film of the present invention preferably includes a step of peeling away the dope film from the metal support. The method for peeling in the above-described method of producing a cellulose acylate film is not restricted, and known method can be used to improve the peeling property.

(Stretching Treatment)

The above-described method of producing a cellulose acylate film of the present invention preferably includes a step of stretching (drawing) the formed cellulose acylate film. The stretching direction of the cellulose acylate film may be along the film conveying direction or along the direction perpendicular to the conveying direction (the transverse direction). More preferably, the film is stretched along the direction perpendicular to the film conveying direction (transverse direction), in view of the subsequent process for producing a polarizing plate with using the film.

The stretching method in the width direction is described, for example, in JP-A-62-115035, JP-A-4-152125, JP-A-4-284211, JP-A-4-298310 and JP-A-11-48271. In the case of stretching in the longitudinal direction, for example, the film can be stretched by adjusting the speed of the film conveying roller to make the film take-up speed faster than the film separation speed. In the case of stretching in the transverse direction, the film can be stretched also by conveying the film while keeping the film width by a tenter and gradually increasing the width of the tenter. The film may also be stretched using a stretching machine (preferably uniaxial stretching using a long stretching machine) after drying.

In the case where the above-described cellulose acylate film is used as a protective film of a polarizer, it is necessary to dispose a transmission axis of the polarizer in parallel to an in-plane slow axis of the resin film of the present invention, in order to prevent light leakage in viewing a polarizing plate from an inclined direction. Since the transmission axis of a polarizer continuously produced in a rolled film state is generally parallel to the width direction of the rolled film, in order to continuously stick the polarizer in a rolled film state and a protective film that is the above-described cellulose acylate film in a rolled film state, it is necessary that the in-plane slow axis of the protective film in a rolled film state is parallel to the width direction of the film. Accordingly, it is preferable that the cellulose acylate film is more stretched in the width direction. Also, the stretching treatment may be achieved on the way of the film formation step, or a raw film having been fabricated and wound up may be subjected to a stretching treatment.

As for the stretching in the transverse direction, stretching of from 5 to 100% is preferable. More preferably the stretching of from 5 to 80% and especially preferably the stretching of from 5 to 40% are conducted. Also, the stretching treatment may be conducted on the way of the film formation step, or alternatively an original (raw) film having been formed and wound may be subjected to a stretching treatment. In the former case, stretching may be conducted under the conditions of containing a certain amount of a remaining solvent. The stretching can be preferably conducted while containing from 0.05 to 50% of the remaining solvent amount which is defined by the following mathematical formula:

Remaining solvent amount=(Mass of Remaining volatile Component/Mass of Film after heat treatment)×100%

It is especially preferable that the stretching of from 5 to 80% is conducted under the condition of the remaining solvent amount of from 0.05 to 50%.

(Drying)

The method of producing the above-described cellulose acylate film preferably includes a step of drying the above-described cellulose acylate film and a step of stretching the dried resin film at a temperature not lower than Tg (−10° C.) from the viewpoint of retardation developing property.

In general, examples of methods for drying the dope on the metal support in relation to the production of the above-described cellulose acylate film include a method of blowing hot air from the surface side of the metal support (drum or belt), namely from the surface of a web on the metal support; a method of blowing hot air from the back surface of the drum or belt; and a back-surface liquid-heat-conduction method by bringing a temperature-controlled liquid in contact with the back surface of the belt or drum, which is the side opposite to the dope casting surface, and heating the drum or belt by way of heat conduction, to control the surface temperature. Of these methods, the back-surface liquid-heat-conduction method is preferable. The surface temperature of the metal support before casting may be arbitrarily set so far as it is not higher than a boiling point of the solvent used in the dope. However, in order to accelerate drying or eliminate fluidity on the metal support, it is preferable that the surface temperature of the metal support is set up at a temperature of from 1° C. to 10° C. lower than a boiling point of the solvent having the lowest boiling point among the solvents used. However, this limitation is not necessarily applied in the case where the casting dope is cooled and peeled off without being dried.

In order to adjust the thickness of the film to a desired value, the concentration of solids contained in the dope, the gap of a slit of a nozzle of the die, the extrusion pressure of the die, the speed of the metal support, etc. may be properly adjusted.

Thus obtained cellulose acylate film is preferably wound up in a length of from 100 to 10,000 m, more preferably from 500 to 7,000 m, and further preferably from 1,000 to 6,000 m, per roll. In winding up, the film is preferably knurled at least in one edge thereof. The width of the knurl is preferably from 3 mm to 50 mm, and more preferably from 5 mm to 30 mm; and the height of the knurl is preferably from 0.5 to 500 μm, and more preferably from 1 to 200 μm. The edge of the film may be knurled on one or both surfaces thereof.

In general, in a large-sized-screen display device, since tinting and lowering of contrast in an inclined direction become remarkable, the above-described cellulose acylate film is especially suitable for use in a large-sized-screen display device. In the case of using the cellulose acylate film as an optical compensation film for large-sized-screen display device, for example, it is preferable that a film is formed in a width of 1,470 mm or more. Also, the polarization plate-protecting film of the present invention includes not only an embodiment of a film piece cut into a size incorporatable into a liquid crystal display device without further cutting operation, but also an embodiment in which the film is prepared in a lengthy form by means of continuous production and wound up in a rolled state. In the polarization plate protecting film of the latter embodiment, the film is stored and conveyed in that state, and the film is cut into a desired size and used at the time of actually incorporating into a liquid crystal display device or sticking to a polarizer or the like. Alternatively, the film in a lengthy form is put to a polarizer composed of a polyvinyl alcohol film or the like as prepared similarly in a lengthy form, and thereafter, the film is cut into a desired size and used when the film is actually incorporated in a liquid crystal display device. As one of the embodiments of an optical compensation film wound up in a rolled state, an embodiment in which the film is wound up in a rolled state having a roll length of 2,500 m or more is exemplified.

[Polarizing Plate]

Also, the present invention relates to a polarizing plate having at least one sheet of the polarizing plate-protecting film of the present invention.

The polarizing plate of the present invention preferably includes a polarizer and the film of the present invention provided on one side of the polarizer. Examples of the polarizer include an iodine-type polarizer, a dye-type polarizer using a dichroic dye and a polyene-type polarizer. The iodine-type polarizer and the dye-type polarizer may ordinarily be produced using a polyvinyl alcohol film. When the cellulose acylate film of the present invention is used as a polarizing plate protective film, the production method of the polarizing plate is not particularly limited and may be produced in accordance with an ordinary method. There is a method of subjecting the obtained cellulose acylate film to an alkali treatment and besides preparing a polarizer by immersing a polyvinyl alcohol film in an iodine solution and stretching the film, and then sticking the thus-treated cellulose acylate film and both sides of the polarizer together with a completely-saponified polyvinyl alcohol solution. In place of the alkali treatment, an easy adhesion processing as described in JP-A-6-94915 and JP-A-6-118232 may be used. Examples of the adhesive that is used for sticking the processed surface of the protective film and the polarizer together include polyvinyl alcohol-type adhesives such as polyvinyl alcohol and polyvinyl butyral, and vinyl-type latexes derived from butyl acrylate or the like. The polarizing plate is comprised of a polarizer and a protective film that protects both sides thereof. Further, the polarizing plate is composed of a protective film and a separate film so that the protective film is stuck to one side thereof, while the separate film is stuck to the other side thereof. The protective film and the separate film are used in order to protect the polarizing plate in shipping thereof, or at the time of product test, or the like. In this case, the protective film is stuck thereto in order to protect a surface of the polarizing plate, and is used in the side opposite to the surface at which the polarizing plate is stuck to a liquid crystal plate. On the other hand, the separate film is used in order to cover an adhesion layer stuck to the liquid crystal plate, and is used in the both sides at which the polarizing plate is stuck to the liquid crystal plate.

As for the method of sticking the cellulose acylate film of the present invention to the polarizer together, they are preferably stuck together so that a transmission axis of the polarizer and a slow axis of the cellulose acylate film of the present invention become substantially parallel to each other. In the liquid crystal display device of the present invention, the transmission axis of the polarizing plate and the slow axis of the cellulose acylate film of the present invention are preferably substantially parallel to each other. Herein, the expression "substantially parallel" means that declination between the direction of the principal refractive index nx of the cellulose acylate film of the present invention and the direction of the transmission axis of the polarizing plate is within 5°. The declination is preferably within 1°, and more preferably within 0.5°. The declination of greater than 1° is not preferable because polarization degree performance under polarizing plate crossed Nicols degrades to generate a light omission.

The embodiments of the polarizing plate of the invention include not only those in the form of a sheet cut so as to be directly incorporated into liquid crystal display devices, but also those in the form of a roll as wound up in continuous production (for example, a roll having a roll length of at least 2500 m or at least 3900 m). For application to large-size-screen liquid crystal display devices, the width of the polarizing plate is preferably at least 1470 mm. The concrete configuration of polarizing plate of the present invention is not restricted and known configuration can be adopted, and, for example, the configuration described in FIG. 6 in JP-A-2008-262161 can be adopted.

[Liquid Crystal Display Device]

The present invention also relates to a liquid-crystal display device that comprises the polarizing plate-protective film of the present invention or the polarizing plate of the present invention.

The liquid-crystal display device of the present invention comprises a liquid-crystal cell and a pair of polarizing plates arranged on both sides of the liquid-crystal cell and is preferably an IPS, OCB or VA-mode liquid-crystal display device in which at least one of the polarizing plates is the polarizing plate of the present invention. An example of an internal configuration of a typical liquid crystal display device is shown in FIG. 1. The concrete configuration of the liquid-crystal display device of the present invention is not specifically restricted, for which any known configuration is employable. The configuration described in FIG. 2 in JP-A-2008-262161 is also preferably adopted for the liquid-crystal display device of the invention.

As described above, according to the present invention, degradation of the polarizer can be suppressed and prevented effectively. The mechanism for developing such effects is shown in FIG. 3 by schematic representation of molecular structure inside the film. As shown here, it is thought that the film of the present invention has a resin structure in which the above-described specific polymer 51 is inserted in free-volume portions which have been formed between molecular chains 52 of the cellulose acylate. This film layer corresponds to a protective film 31a, when explained in reference to the polarizing plate 21B of the above-described FIG. 2. Further, the polarizer 32 is incorporated in its interior. However, transmission of water ($H_2O$) is prevented due to the protective film 311a which has been hydrophobirized by the specific polymer 51, thereby preventing penetration of water to the polarizer 32. As a result, decomposition of the $BO_4$ structure which forms a bridge between the molecular chains of PVA 53 inside the polarizer is prevented. Further, it is thought that even if some amount of B (boron) is generated by decomposition, dissipation of the boron is suppressed effectively whereby prevention of the polarizer from time degradation has been achieved. However, the present invention is not construed to a limited extent by both FIG. 3 and the above explanation.

EXAMPLES

The present invention will be described in more detail based on examples given below, but the invention is not meant to be limited by these.

Synthesis Example 1

To 70 g of acetone, 30 g of coumarone resin [V-120S (trade name, manufactured by NITTO CHEMICAL CO., LTD.)] was dissolved. The solution was poured into 500 ml of methanol, and then the precipitate was removed by suction filtration, and then the filtrate was separated. The solution after separation was distilled away under reduced pressure to obtain 8.2 g of Poymer (P-ex1).

Synthesis Examples 2 to 4

Polymers (P-ex2) to (P-ex4) were obtained in the same manner as the synthesis of P-ex1 in Synthesis Example 1, except that V-120S was replaced with H-100 (trade name, manufactured by NITTO CHEMICAL CO., LTD.) or G-90 (trade name, manufactured by NITTO CHEMICAL CO., LTD.).

The compositions of (P-ex1) to (P-ex4) are composed of indene, styrene and coumarone as main constituents. Examples of the compositions of (P-ex1) to (P-ex4) are shown in the following table. The numbers in the table represent a molar ratio. "Others" in the table represent constituents derived from an oil fraction. Specifically, tar acids such as phenol, cresol and xylenol are exemplified.

TABLE F

|       | Indene | Styrene | Coumarone | Others |
|-------|--------|---------|-----------|--------|
| P-ex1 | 68     | 19      | 7         | 6      |
| P-ex2 | 72     | 10      | 7         | 11     |
| P-ex3 | 66     | 22      | 7         | 5      |
| P-ex4 | 77     | 9       | 7         | 7      |

Synthesis Example 5

Into a 300-mL-volume three-neck flask equipped with a stirrer, a thermometer, a reflux condenser, and a nitrogen gas inlet tube, 20.0 g of methyl ethyl ketone was charged, and the temperature was raised to 80° C. A mixed solution containing 28.5 g of indene, 7.3 g of styrene, 4.2 g of coumarone, 20.0 g of methyl ethyl ketone and 16.0 g of "V-601" (trade name, produced by Wako Pure Chemical Industries, Ltd.) was added dropwise at a constant rate so that the dropwise addition could be completed in 3 hours. After completion of the dropwise addition, followed by stirring for one hour, (1) a solution containing 2.0 g of "V-601" and 2.0 g of methyl ethyl ketone was added thereto, and the resultant solution was stirred for 2 hours. Subsequently, the step (1) was repeated twice. Further, the resultant solution was stirred for 6 hours and then poured into 1 liter of methanol and then the resultant product was dried, thereby obtaining 38.5 g of polymer (P-ex5). The weight-average molecular weight (Mw) of the obtained polymer was 770 (calculated in terms of polystyrene by gel permeation chromatography (GPC); columns used: TSKgel SuperHZM-H, TSKgel SuperHZ4000 and TSKgel SuperHZ200 (manufactured by Tosoh Corporation)). Tetrahydrofuran was used as a carrier.

Synthesis Examples 6 to 7

The following exemplified compounds (P-ex6) to (P-ex7) were obtained in the same manner as the synthesis of (P-ex5) in Synthesis Example 6, except that indene/styrene/coumarone were replaced with indene and coumarone. The numbers of constituent unit in (P-ex5) represent a molar ratio. (This is applied to each of structural formulae described in the present specification.)

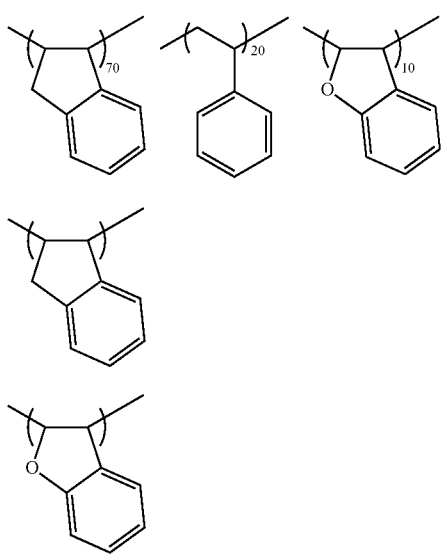

(P-ex5)

(P-ex6)

(P-ex7)

Comparative Synthesis Example 1

The following exemplified compound (P-c1) was obtained in accordance with the synthetic method described in paragraph [0187] of JP-A-2003-12859.

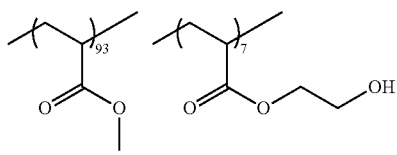

(P-c1)

Comparative Synthesis Example 2

The following exemplified compound (P-c2) was obtained in accordance with the synthetic method described in paragraph [0056] of International Publication WO2007/125764 pamphlet.

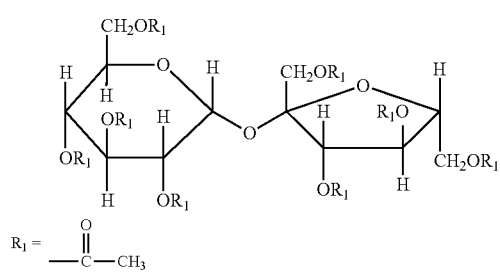

(P-c2)

Example 1 and Comparative Example 1

(1) Film Formation of Cellulose Acylate Film

<Preparation of Cellulose Acylate>

A cellulose acylate having acetyl substitution degree of 2.87 was prepared. As a catalyst, sulfuric acid (in an amount of 7.8 parts by mass relative to 100 parts by mass of cellulose) was added, and a carboxylic acid, which serves as a raw material for an acyl substituent, was added for acylation at 40° C. After the acylation, ripening was conducted at 40° C. Further, the low molecular weight ingredient of the cellulose acylate was removed by washing with acetone.

<Preparation of Dope Solution for Surface Layer>
(Preparation of Cellulose Acylate Solution)

The following composition was put into a mixing tank and stirred to dissolve the components to prepare a cellulose acylate solution.

| Composition of cellulose acylate solution | |
|---|---|
| Cellulose acetate having acetyl substitution degree of 2.87 and polymerization degree of 370 | 100.0 parts by mass |
| MONOPET (registered trademark) SB (plasticizer 1) manufactured by Dai-Ichi Kogyo Seiyaku Co., Ltd. | 9.0 parts by mass |
| SAIB-100 (plasticizer 2) manufactured by Eastman Chemical Company | 3.0 parts by mass |
| Methylene dichloride (first solvent) | 353.9 parts by mass |
| Methanol (second solvent) | 89.6 parts by mass |
| n-Butanol (third solvent) | 4.5 parts by mass |

The plasticizer 1 is a sucrose benzoate, and the plasticizer 2 is a sucrose acetate isobutyrate.
(Preparation of Matting Agent Solution)

The following composition was put into a disperser and stirred to dissolve the components to prepare a matting agent solution.

| Composition of matting agent solution | |
|---|---|
| Silica particles having a mean particle size 20 nm (trade name: AEROSIL R972, manufactured by Nihon Aerosil Co., Ltd.) | 2.0 parts by mass |
| Methylene dichloride (first solvent) | 69.3 parts by mass |
| Methanol (second solvent) | 17.5 parts by mass |
| n-Butanol (third solvent) | 0.9 parts by mass |
| Cellulose acylate solution described above | 0.9 parts by mass |

(Preparation of UV Absorbent Solution)

The following composition was put into a mixing tank and stirred while heating to dissolve each component to prepare the UV absorbent solution 3.

| Composition of UV absorbent solution | |
|---|---|
| UV Absorbent C described below | 20.0 parts by mass |
| Methylene dichloride (first solvent) | 61.0 parts by mass |
| Methanol (second solvent) | 15.4 parts by mass |
| n-Butanol (third solvent) | 0.8 parts by mass |
| Cellulose acylate solution described above | 12.8 parts by mass |

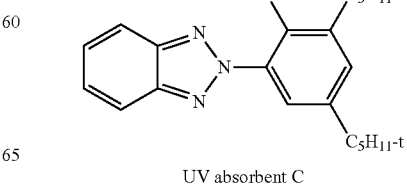

UV absorbent C

Each of 1.3 parts by mass of the above-described matting agent solution and 3.4 parts by mass of the UV absorbent solution was filtrated, and then these solutions were mixed using an inline mixer. Further, 95.3 parts by mass of the cellulose acylate solution was added thereto, and these solutions were mixed using an inline mixer, thereby preparing the solution for skin layer.

<Preparation of Dope for Base Layer>
(Preparation of Cellulose Acylate Solution)

The following composition was put into a mixing tank and stirred to dissolve each component to prepare the Dope for base layer.

| | |
|---|---|
| Cellulose acetate having acetyl substitution degree of 2.87 and polymerization degree of 370 | 100.0 parts by mass |
| MONOPET (registered trademark) SB (plasticizer 1) manufactured by Dai-Ichi Kogyo Seiyaku Co., Ltd. | 9.0 parts by mass |
| SAIB-100 (plasticizer 2) manufactured by Eastman Chemical Company | 3.0 parts by mass |
| Polymer (P-ex1) of the present invention | 4.0 parts by mass |
| UV Absorbent C described above | 2.0 parts by mass |
| Methylene dichloride (first solvent) | 297.7 parts by mass |
| Methanol (second solvent) | 75.4 parts by mass |
| n-Butanol (third solvent) | 3.8 parts by mass |

The plasticizer 1 is a sucrose benzoate, and the plasticizer 2 is a sucrose acetate isobutyrate.

<Casting>

The dope (dope for base layer) prepared as described above and the dope for surface layer to be disposed on both sides of the dope for base layer were uniformly cast from a casting opening onto a stainless casting support (support temperature: −9° C.) so that three layers consisting of the base layer and both surface layers were formed thereon at the same time, using a drum caster. The resultant film was peeled from the support in the state that the amount of a remaining solvent in the dope of each layer was about 70% by mass, and then both ends in the width direction of the film were fixed with a pin tenter, and then the film was dried while stretching it 1.28 times in a transverse direction in the state that the amount of a remaining solvent was from 3 to 5% by mass. After that, the film was further dried by conveying it between rolls of a thermal treatment apparatus, thereby obtaining the cellulose acylate film 101 of Example. The thickness and the width of the obtained cellulose acylate film 101 were 60 μm and 1480 mm respectively.

The polarizing plate-protecting films of Examples 102 to 115 and Comparative Examples c11 to c13 were produced in the same manner as the above-described film 101, except that the kinds and the additive amounts of the compounds shown in Table 1 were used instead of polymer (P-ex1). The evaluation results of each film in terms of the following items are shown in Table 1.

The cellulose acylate film of Example 116 was produced in the same manner as the above-described film 109, except that the plasticizer 1 and the plasticizer 2 were replaced with 10.0 parts by mass of the above-described polycondensation ester-type plasticizer (J-39).

The cellulose acylate films of Examples 117 to 119 and Comparative Example c14 were produced in the same manner as the above-described film 116, except that the kinds and the additive amounts of the compounds shown in Table 1 were used instead of H-100. The evaluation results of each of the films in terms of the following items are shown in Table 1.

[Evaluation]
(Measurement of Water-Vapor Transmission Ratio)

The weight of water vapor that passes through the specimen with 1 $m^2$ of area for 24 hours in the atmosphere of temperature of 60° C. and relative humidity of 95% RH was measured in accordance with the water-vapor transmission ratio test (cup method) of JIS Z0208.
A: Water-vapor transmission ratio is less than 1200 $g/m^2 \cdot day$.
B: Water-vapor transmission ratio is 1200 to 1300 $g/m^2 \cdot day$.
C: Water-vapor transmission ratio is more than 1300 $g/m^2 \cdot day$.

(Evaluation of Polarizing Plate Durability)

With respect to the polarizing plates prepared in each of the above-described Examples and Comparative Examples, measurement of perpendicular transmittance of the polarizer at the wavelength of 410 nm was conducted in accordance with the method described in the present specification.

After that, the samples were stored for 336 hours under the environment of 80° C. and relative humidity 90% RH, and then the perpendicular transmittance was measured in the same manner as described above. A change of the perpendicular transmittance before and after aging was measured. By taking the change as the polarizer durability, the results of evaluation were shown in the above Table 6. It is noted that the relative humidity under the environment with no humidity conditioning was in the range of from 0 to 20% RH.
A: less than 0.6%
B: from 0.6 to 1.0%
C: more than 1.0%

(Measurement of Decrease Ratio of Boric Acid Content in Polarizer)
<Quantitative Determination of Boric Acid Content in Polarizer Before Aging>

The polarizing plate was punched out to the size of 1 cm×1 cm. After addition of 3 cc of nitric acid, it was subjected to an ashing process at a highest temperature of 230° C. using a microwave. After adjusting the total content to 50 g by adding water, the amount of boron was measured using ICP-OES (Optima 7300 DV) manufactured by Perkim Elmer Company.
<Quantitative Determination of Boric Acid Content after Aging Under the Conditions of 80° C. And Relative Humidity of 90% for 336 Hours>

The polarizing plate protective film was peeled from the polarizing plate after aging, and only the polarizer was taken out. By subjecting this to the same process as that before aging, the amount of boron in the polarizer was measured.

The decrease ratio of boric acid content (%) before and after aging of 336 hours under the conditions of 80° C. and relative humidity of 90% was calculated in accordance with the following equation.

$$\{1-(\text{boron content after aging})/(\text{boron content before aging})\} \times 100$$

A: less than 50%
B: from 50 to 60%
C: more than 60%

(Measurement of Haze)

The haze was measured by using a film sample of 40 mm×80 mm at 25° C. and 60% RH with the use of a haze meter "HGM-2DP" (trade name, manufactured by Suga Shikenki Co., Ltd.), in accordance with JIS K-6714.
A: Haze was 1% or less.
B: Haze was more than 1%, and 5% or less.
C: Haze was more than 5%.

TABLE 1

| | (Co)polymer A | | | | Evaluation | | | | |
|---|---|---|---|---|---|---|---|---|---|
| No. | Kind | Mw[a] | Additive amount[b] | Plasticizer | Boric acid content | Durability | Water-vapor transmission ratio | Haze | Remarks |
| 101 | P-ex1 | 550 | 4 | 1, 2 | A | A | A | A | This invention |
| 102 | P-ex2 | 460 | 4 | 1, 2 | A | A | A | A | This invention |
| 103 | P-ex3 | 520 | 4 | 1, 2 | A | A | A | A | This invention |
| 104 | P-ex4 | 490 | 4 | 1, 2 | A | A | A | A | This invention |
| 105 | P-ex2 | 460 | 2 | 1, 2 | A | A | A | A | This invention |
| 106 | P-ex2 | 460 | 1 | 1, 2 | A | A | B | A | This invention |
| 107 | P-ex2 | 460 | 8 | 1, 2 | A | A | A | A | This invention |
| 108 | V-120S[c] | 900 | 4 | 1, 2 | A | A | A | B | This invention |
| 109 | H-100[c] | 670 | 4 | 1, 2 | A | A | A | A | This invention |
| 110 | G-90[c] | 770 | 2 | 1, 2 | A | A | A | B | This invention |
| 111 | G-100N[c] | 730 | 2 | 1, 2 | A | A | A | B | This invention |
| 112 | P-ex5 | 770 | 4 | 1, 2 | A | A | A | A | This invention |
| 113 | P-ex6 | 920 | 8 | 1, 2 | A | A | A | A | This invention |
| 114 | P-ex7 | 1000 | 25 | 1, 2 | A | A | A | B | This invention |
| 115 | P-ex3 | 520 | 0.05 | 1, 2 | B | B | B | A | This invention |
| 116 | H-100[c] | 670 | 4 | J-39 | A | A | A | A | This invention |
| 117 | P-ex2 | 460 | 4 | J-39 | A | A | A | A | This invention |
| 118 | P-ex2 | 460 | 2 | J-39 | A | A | A | A | This invention |
| 119 | V-120S[c] | 900 | 4 | J-39 | A | A | A | B | This invention |
| c11 | P-c1 | 5000 | 4 | 1, 2 | C | C | B | C | Comparative example |
| c12 | P-c2 | 680 | 4 | 1, 2 | C | C | C | A | Comparative example |
| c13 | None | — | — | 1, 2 | C | C | C | A | Comparative example |
| c14 | None | — | — | J-39 | C | C | C | A | Comparative example |

[a]Mw: Weight average molecular weight
[b]It indicates the parts by mass (in the basic layer) with respect to 100 parts by mass of the cellulose acylate.
[c]Each of them represents product name of the coumarone resin manufactured by NITTO CHEMICAL CO., LTD.

From the results shown in the above Table 1, it was found that the resin film of the present invention (Examples) containing the polymer containing the constituent unit having the structure unit represented by formula (1) has a low water-vapor transmission ratio and makes it possible to suppress effectively time degradation of the polarizer and also to achieve a good haze value.

Both of films c11 and c12 of Comparative Examples are cellulose acylate-based films, but they are embodiments which do not contain the polymer used in the present invention and it was found that these films are inferior in terms of both decrease ratio of boric acid content and change of the perpendicular transmittance, when compared to the films of the present invention. The film c11 is also inferior in terms of haze. The film c12 is good in terms of haze, but it is inferior in terms of water-vapor transmission ratio. The film c13 of Comparative Example is an example in which any polymer to be blended in cellulose acylate is not used, and it was found that the film c13 is inferior in terms of each of decrease ratio of boric acid content, change of perpendicular transmittance and water-vapor transmission ratio, when compared to the films of the present invention.

Example 2 and Comparative Example 2

(2) Preparation of Polarizing Plate

{Saponification Treatment of Protective Film of Polarizing Plate}

The polarizing-plate protective film produced in Example 1 was dipped in a 2.3 mol/L aqueous solution of sodium hydroxide at 55° C. for 3 minutes. Next, the film was washed in a water washing bath at room temperature and then neutralized with 0.05 mol/L sulfuric acid at 30° C. Next, it was washed again in a water washing bath at room temperature and dried in a hot air stream at 100° C. Thus, the surface of the polarizing-plate protective film of Example 1 was saponified. Herein, as for the polarizer, a commonly used one as explained in the above-described item of [Polarizing plate] was used.

{Preparation of Polarizing Plate}

Iodine was adsorbed by a stretched polyvinyl alcohol film to prepare a polarizer.

The saponified polarizing-plate protective film 101 of Example 1 was stuck to one surface of the polarizer, using a polyvinyl alcohol based adhesive. A commercial cellulose triacetate film (trade name: Fujitac TD80UF, manufactured by FUJIFILM Corporation) was saponified in the same method, and the saponified cellulose triacetate film was stuck to the polarizer, using a polyvinyl alcohol based adhesive, at the side of the polarizer opposite to the side where the polarizing plate protective film of Example 1 was stuck.

In this case, the films were so stuck to the polarizer that the transmission axis of the polarizer could be perpendicular to the slow axis of the polarizing-plate protective film produced in Example 1, and that the transmission axis of the polarizer could be perpendicular to the slow axis of the commercial cellulose triacetate film.

Thus, the polarizing plate 201 of this invention was prepared.

With using the polarizing-plate protective films 102 to 103 (this invention) and c11 to c13 (comparative example), saponification and preparation of polarizing plates were conducted in the same manner as described above, to produce polarizing plates 202 to 203 (this invention) and c21 to c23 (comparative example).

Example 3 and Comparative Example 3

Manufacture of Liquid Crystal Display Device

The polarizing plate of a commercially-available liquid crystal television set (BRAVIA J5000, manufactured by Sony Corporation) at the side of viewer was peeled, and the polarizing plate 201 of the present invention using the polarizing plate-protecting film 101 of Example 1 was put with an adhesive so that the polarizing plate-protecting film 101 was disposed at the side of the liquid crystal cell (film 31b in FIG. 1). The transmission axis of the polarizing plate at the side of viewer was vertically disposed. This situation is as illustrated in the schematic view of FIG. 1. The thus-produced liquid crystal display device was equipped with, in the following order from the underside of the drawing, light source 26, light guide plate 25, a first polarizing plate 21A (polarizer 32, polarizing films 31a and 31b), array substrate 24 having an oriented film and a transparent electrode, liquid crystal layer 23, color filter substrate 22 having an oriented film and a transparent electrode, and polarizing plate 21B. As described above, the protective film 31b of the second polarizing plate 21B was exchanged to films of the Examples of the present invention or Comparative Examples. In this time, the protective film was disposed so that the drawing direction of the protective film and the polarizing direction R of the polarizing plate would coincide each other.

Further, liquid crystal display devices 302 to 303 of Examples and liquid crystal display devices c31 to c33 of Comparative Examples were produced in the same manner as the above-described liquid crystal display device, except that protecting films and polarizing plates of other Examples and polarizing plate-protecting films and polarizing plates of Comparative Examples were used.

The thus-produced liquid crystal display devices were left for 24 hours under the environment of 60° C. and 90% RH, and then display unevenness was checked. As a result, the liquid crystal display devices of the present invention were favorable in the point that the unevenness was not generated or the area of the generated unevenness was less than the liquid crystal display devices using each of the polarizing plate-protective films of Comparative Examples.

Example 4 and Comparative Example 4

Films were prepared in the same manner as described above, except that the above-described Polymer P-ex1 was replaced with those in which the substituents shown in the above-described formula P-1 were changed as described below. The results of measurement evaluation in the above-described terms with respect to each of the films are shown below.

TABLE 2

|  | $R^{21}$ | m1 | $R^{22}$ | m2 | $R^{23}$ | m3 | $R^{24}$ | m4 | $R^{101}$ | $R^{102}$ | $R^{103}$ |
|---|---|---|---|---|---|---|---|---|---|---|---|
| P-ex1a | H | 0 | H | 0 | H | 0 | H | 0 | H | H | $CH_3$ |
| P-ex1b | H | 0 | H | 0 | H | 0 | $CH_3$ | 1 | H | H | $CH_3$ |
| P-ex1c | H | 0 | H | 0 | H | 0 | $CH_3$ | 1 | H | H | H |
| P-ex1d | H | 0 | H | 0 | H | 0 | $CH_3$ | 2 | H | H | H |
| P-ex1e | H | 0 | H | 0 | H | 0 | $CH_3$ | 3 | H | H | H |
| P-ex1f | H | 0 | $CH_3$ | 1 | H | 0 | H | 0 | H | H | H |
| P-ex1g | H | 0 | H | 0 | H | 0 | OH | 1 | H | H | H |
| P-ex1h | $CH_3$ | 1 | H | 0 | H | 0 | H | 0 | H | H | H |
| P-ex1i | H | 0 | H | 0 | $CH_3$ | 1 | H | 0 | H | H | H |

TABLE 3

|  | Decrease ratio of boric acid content | Change of perpendicular transmittance | Water-vapor transmission ratio |
|---|---|---|---|
| P-ex1a | A | A | A |
| P-ex1b | A | A | A |
| P-ex1c | A | A | A |
| P-ex1d | A | A | A |
| P-ex1e | A | A | A |
| P-ex1f | A | A | A |
| P-ex1g | A | A | A |
| P-ex1h | A | A | A |
| P-ex1i | A | A | A |

From the above results, it is found that according to the present invention, low water-vapor transmission ratio is achieved and also good resistance to degradation of the polarizer is exerted by use of the polymer having a specific aromatic ring skeleton, regardless of introduction of arbitrary substituents thereto.

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2011-141240 filed in Japan on Jun. 24, 2011 and No. 2012-012483 filed in Japan on Jan. 24, 2012, which are entirely herein incorporated by reference.

REFERENCE SIGNS LIST

1 Dope for surface layers
2 Dope for core layer
3 Co-casting Giesser
4 Casting support
21A, 21B Polarizing plate
22 Color filter substrate
23 Liquid crystal layer
24 Array substrate
25 Light guide plate
31a, 31b Cellulose acylate film (Polarizing plate protective film)
32 Polarizer

The invention claimed is:
1. A cellulose acylate film, comprising:
   a cellulose acylate; and
   a specific polymer, the specific polymer containing a repeating unit derived from a monomer represented by formula (1):

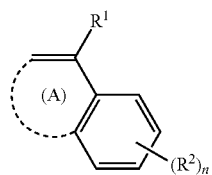
(1)

wherein $R^1$ represents a hydrogen atom or an aliphatic group having 1 to 4 carbon atoms; $R^2$ represents a substituent; (A) represents an atomic group necessary to form a 5- or 6-membered ring; and n represents an integer of 0 to 4, and wherein the specific polymer is a coumarone resin containing three components represented by the following formula (P-1) as repeating units;

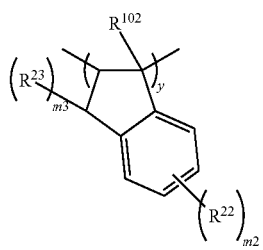
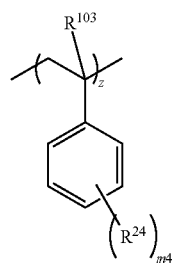
(P-1)

wherein, in formula (P-1), $R^{21}$, $R^{22}$, $R^{23}$ and $R^{24}$ each independently represent a substituent; x represents a molar ratio of 0 to 40; y represents a molar ratio of 5 to 95; z represents a molar ratio of 0 to 70; m1 and m2 represent an integer of 0 to 4; m3 represents an integer of 0 to 2; m4 represents an integer of 0 to 5; and $R^{101}$, $R^{102}$ and $R^{103}$ represent a hydrogen atom or an aliphatic group having 1 to 4 carbon atoms.

2. The cellulose acylate film according to claim 1, wherein the specific polymer comprises a copolymer containing the repeating unit derived from the monomer represented by formula (1) and a repeating unit other than the repeating unit derived from the monomer represented by formula (1).

3. The cellulose acylate film according to claim 1, wherein, in formula (1) of the specific polymer, $R^1$ represents a hydrogen atom; (A) represents an atomic group necessary to form a 5-membered ring; and $R^2$ represents a methyl group or a hydroxyl group.

4. The cellulose acylate film according to claim 1, wherein the repeating unit derived from the monomer represented by formula (1) is represented by the following formula (2-1), formula (2-2), formula (2-3), formula (2-4), formula (2-5), or formula (2-6);

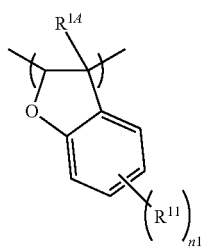
(2-1)

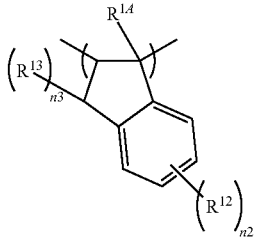
(2-2)

(2-3)

(2-4)

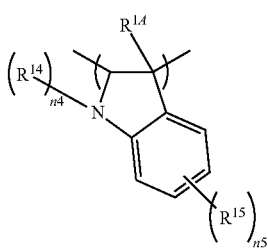
(2-5)

(2-6)

wherein, in formulae (2-1) to (2-6), $R^{10}$ to $R^{19}$ each independently represent a substituent; n1, n2, n5, n6, n8 and n10 each independently represent an integer of 0 to 4; n3, n7 and n9 each independently represent 0 to 2; n4 represents 0 or 1; and $R^{14}$ represents a hydrogen atom or an aliphatic group having 1 to 4 carbon atoms.

5. The cellulose acylate film according to claim 1, wherein a weight-average molecular weight of the specific polymer is from 200 to 10,000.

6. The cellulose acylate film according to claim 1, wherein the cellulose acylate satisfies an acyl substitution degree of the following mathematical formula:

$$1.5 \leq A \leq 3.0 \ (A: \text{acyl substitution degree}).$$

7. The cellulose acylate film according to claim 1, wherein the cellulose acylate satisfies an acyl substitution degree of the following mathematical formula:

$$2.0 \leq AB \leq 3.0 \ (A: \text{acyl substitution degree}).$$

8. The cellulose acylate film according to claim 1, wherein the additive amount of the specific polymer is from 0.1 parts by mass to 100 parts by mass with respect to 100 parts by mass of the cellulose acylate.

9. The cellulose acylate film according to claim 1, further comprising a polycondensation ester compound obtained by polycondensation of a dicarboxylic acid represented by the following formula (4) with a diol represented by the following formula (5):

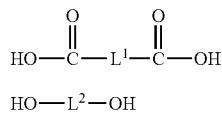

(4)

(5)

wherein, in formulae (4) and (5), $L^1$ is an aliphatic group having 2 to 18 carbon atoms or an aromatic group having 6 to 15 carbon atoms; $L^2$ is an aliphatic group having 2 to 8 carbon atoms; and the aliphatic group may be a straight chain or a branch.

10. The cellulose acylate film according to claim 9, wherein the number-average molecular weight of the polycondensation ester compound is from 500 to 2000.

11. The cellulose acylate film according to claim 9, wherein the terminal of the polycondensation ester compound is sealed.

12. The cellulose acylate film according to claim 1, further containing at least one compound selected from a monosaccharide and a carbohydrate derivative composed of from 2 to 10 monosaccharide units.

13. The cellulose acylate film according to claim 12, wherein the carbohydrate derivative is substituted by an alkyl group, an aryl group or an acyl group.

14. The cellulose acylate film according to claim 12, wherein the carbohydrate derivative is substituted by an acyl group.

15. A polarizing plate, comprising:
a polarizer; and
two protective films disposed on both sides of the polarizer, at least one of the two protective films being made of the cellulose acylate film according to claim 1.

16. A liquid crystal display device, comprising:
a liquid crystal cell; and
two polarizing plates disposed on both sides of the liquid crystal cell, at least one of the polarizing plates being made of the polarizing plate according to claim 15.

* * * * *